United States Patent Office 3,563,931
Patented Feb. 16, 1971

3,563,931
METHOD OF MAKING CHROMOGEN-BONDED-POLYMER AND PRODUCTS THEREOF
Shojiro Horiguchi, 965 Shimohoya, Hojamachi, Kitatama-gun, Tokyo, Japan, and Michiei Nakamura, 156 5-chome, Motobuto-cho, Urawa-shi, Saitama-ken, Japan
No Drawing. Filed Aug. 6, 1965, Ser. No. 477,932
Int. Cl. C08f 1/84, 45/66; C08g 51/66
U.S. Cl. 260—41                                    13 Claims

ABSTRACT OF THE DISCLOSURE

A method of making a chromogen-bonded-polymer which comprises the steps of diazotizing a chromogen-containing amino compound in aqueous medium containing hydrochloric acid in a quantity which exceeds its theoretically required molar quantity of hydrochloric acid by at least 10 mols per one amino radical to produce the diazotized product of the chromogen; stabilizing the diazotized product with a stabilizer to produce the stabilized diazonium or diazo product of the chromogen; mixing the resulting stabilized product with an addition polymerizable monomer; and polymerizing the monomer using the stabilized diazonium or diazo product as an initiator for the polymerization of the monomer to form the chromogen-bonded-polymer.

---

This invention relates to colored polymers. More particularly, it relates to a novel chromogen-bonded-polymer, a method of making such chromogen-bonded-polymer and a method of coloring articles therewith.

It is well known that conventional dyes normally utilized in the dyeing industry and which are bright in color are characterized by weak resistance to light, heat, chemicals, migration, solvents, etc. Pigments have characteristics superior to dyes with respect to resistance to degrading phenomena such as the aforesaid light, heat, chemicals, etc. However, pigments present the disadvantages in their use in that the brightness of their color and their transparency is much inferior to that of conventional dyes both in the cases of a single color or a combination of colors. Consequently, when pigment is utilized as a coloring agent, since its particles are larger than dye particles, the pigment has to be repeatedly kneaded with solvents, varnishes, plasticizers, plastics and like materials in diverse dispersing apparatus to produce smaller particles thereof.

However, pigment powder during its production process tends to aggregate and flocculate when it undergoes pressure filtering in such process and then tends to further aggregate when it is dried to form very hard clusters. Such clusters, once formed, can no longer even be dispersed satisfactorily completely no matter what mechanical energy or means are utilized to effect dispersion. Consequently, since, of necessity, pigment particles in dispersion are much larger than those of dyes, not only are pigments comparatively opaque as compared to the transparency of dyes but the brightness of their color is much inferior to that of dyes. Furthermore, large particles result in the lowering of abrasion resistance in the case of coatings and in the degradation of mechanical properties in the case of mixed-coloring, i.e., inner coloring and thereby deleteriously affect the colored material by causing ageing, degradation, excoriation and delamination.

Accordingly, it is an important object of this invention to provide a chromogen-bonded-polymer which is characterized by good qualities of color brightness and transparency and which exhibits superior resistance to degrading phenomena such as light, heat, chemicals, migration and the like and which is characterized by good retention of desired mechanical and electrical properties.

It is another object to provide an addition-polymer which has in its structure at least one chromogen portion, i.e., to provide a chromogen-bonded-polymer.

It is a further object of the invention to provide a process for making the addition-polymer of the immediately preceding object with a high yield rate.

It is yet another object to provide a process for making a coloring agent using the aforesaid chromogen-bonded-polymer.

It is yet a further object to provide a process for coloring articles with the coloring material as set forth in the immediately preceding object.

A chromogen-bonded-polymer is a colored polymer in which a chromogen portion is directly and chemically bonded to the polymer portion. Such chromogen-bonded-polymer is an excellent coloring agent, has a brightness of color comparable to the brightness of the color of dyes, resistance to light and to chemicals which are superior to those of pigments and a fixing strength comparable to high polymer binders.

The following generally are methods for producing a chromogen-bonded-polymer:

(1) A method comprising the steps of introducing a diazonium radical into a chromogen. The subjection of the resulting diazonium salt of the chromogen to a pH variation, heat, light, etc., causes such salt to be decomposed to discharge nitrogen gas to form free radicals which function as a polymerization initiator for the polymerization of addition-polymerizable monomers to thereby bond the chromogen to the monomer with a co-valent bond. Concurrently, the free radicals continually propagate to further monomers to effect polymerization to produce the chromogen-bonded-polymer.

(2) A method comprising the steps of introducing addition-polymerizable radicals into a chromogen to form an addition-polymerizable chromogen and copolymerizing such addition-polymerizable chromogen with other addition-polymerizable monomers using a conventional polymerization initiator or employing an oxidizing or reducing agent or the application of light to effect polymerization to produce the chromogen-bonded-polymer.

Using methods 1 and 2, as set forth hereinabove, one or more species of monomers, suitable for varied purposes as a coloring agent can be selected from known monomers and can be readily utilized.

(3) A method comprising the steps of introducing condensable radicals into a chromogen and condensing the resulting condensable chromogen with condensable monomers, or polymers which can be condensed with the aforesaid radicals to form the chromogen-bonded-polymer.

(4) A method in which the chromogen-bonded-polymer produced by methods 1 to 3 as set forth hereinabove, is reacted with a monomer or polymer, and wherein solubilizable, dispersible radicals are introduced into the chromogen-bonded-polymer.

The chromogen-portion of the chromogen-bonded-polymer may be selected from materials such as the phthalocyanine group, the indigo and thioindigo group, the anthraquinone group, the perinone group, the perylene group, the quinacridone group, the dioxazine group, sulfur pigments and dyes, etc., homocyclic and heterocyclic chromogens, and the azo group such as azo coupling pigments and dyes and azo condensation pigments and dyes, etc. and basic lake pigments and the like.

In making a chromogen-bonded-polymer in which the chromogen and polymer portions therein are directly and chemically bonded, it has been found that the usual method of employing a relatively low concentration of hydrochloric acid in the diazotization of the chromogen-containing amino compound to provide the polymerization initiator for polymerizing addition-polymerizable monomer or monomers results in a low ratio of chromogen portion to polymer portion in the produced chromogen-bonded-polymer, i.e., about 1 to 4. Furthermore, the yield rate of final polymer product has been only about 30 to 40% with such usual method.

Thus, in such usual method for diazotizing of an amino compound of a chromogen such as the converting of tetra-amino-copper phthalocyanine to tetradiazo-copper phthalocyanine, about 8 moles of hydrochloric acid per amino radical may be used, such amount being about 6 moles HCl more per amino radical than the theoretical 2 moles required in the diazotization reaction. It has been found that employing these molar ratios of hydrochloric acid reactant to amino radical, there is attained only a 40 to 50% diazotization rate even if the diazotization is carried out while maintaining a very low reaction temperature. It has further been found that much insoluble residue of diazotization remains and that satisfactory polymerization does not occur during the polymerization step whereby there results a poor monomer reaction rate with its concomitant unsatisfactory final yield rates. In this latter connection, polymerization is carried out after the neutralization of excessive hydrochloric acid on the assumption that the quantity of hydrochloric acid is sufficient for the diazotization process. It has also been found that high contents of the chromogen portion of the final polymer cannot even be obtained through a purification process.

As a result of intensive investigation, it has been discovered that, contrary to the above stated original assumption, the amount of hydrochloric acid that is required in excess of the 2 moles per amino radical which are theoretically required, to provide a good yield is at least 10 moles.

However, in a highly concentrated aqueous solution of hydrochloric acid, diazotization reaction begins immediately and vigorously in the reaction system and the temperature thereof rises rapidly when monomers are added thereto which may cause some of the monomer material to be spurted out with the loss thereof. Furthermore, an increased amount of by-product of Cl-homopolymer resulting from Cl or Cl⁻, Cl⁺ groups of the diazonium salt acts as an initiator to introduce a further loss of monomer, all of these factors combining to lower the yield rate of the chromogen-bonded-polymer. In addition, during the polymerization process and thereafter, monomers containing an ester radical and an amide radical frequently react in accordance with the reaction; R—COOR′, R—CONH₂→RCOOH, which may result in the decreasing or elimination of desired properties in the polymer portion of the final product, i.e., the chromogen-bonded-polymer.

To overcome the disadvantageous factors presented by the high concentration hydrochloric acid medium and yet avail of the high yield rates enabled thereby, it has been found that if the diazonium chloride in such medium is stabilized while concurrently a precipitation filtration and separation of hydrochloric acid with a centrifugal separation is carried out and then the precipitate is resolubilized in water and monomers are added thereto under mild conditions for polymerization, there results a much lower loss of monomers and a high yield rate is obtained in the production of the polymer portion. A stabilizer for the diazonium chloride may suitably be, for example, a heavy metal salt such as zinc chloride, stannic chloride, calcium chloride, barium chloride, aluminum chloride, etc., inorganic acid such as fluoroboric acid, sulfonic acids and salts thereof such as dodecylbenzene sulfonic acid, p-chlorobenzene sulfonic acid, naphthalene-2,6-disulfonic acid, naphthalene 1.5-disulfonic acid, poly-(methylene-naphthalene)-polysulfonic acid, the homologs of the sulfonic acids and their salts, sulfates such as laurylsulfate, etc., and amino compounds such as 2-methyliminobenzoic acid-5-sulfonic acid, N-methyltaurine, sarcosine, etc., and the like.

The stabilized diazonium salts or stabilized diazo compounds which may be used are prepared by diazotizing chromogen-containing amino compounds and stabilizing them using aforementioned stabilizers.

Chromogens which are directly bonded to the polymer portion in the final product, i.e., the chromogen-bonded-polymer, may suitably include the following, viz, cyclic group and heterocyclic group, such as anthrapyrimidine, flavanthrone, dibromoanthanthrone, pyranthrone, perylene vermilion, perylene scarlet, phthaloperinone, acridone red, oxazole red, isoviolanthrone, quinocridone, dichloro-quinacridone, carbazole dioxazine, 2.6-bis-[anthraquino-nyl-(1)-amino]-4-(phenoxy)-s-triazine, vat orange GR, indanthrone, 2.4.6-tris-[4-(benzoic amido)-anthraquino-nyl-(1)-amino]-s-triazine, etc., the indigo group, such as, indigo, dichlorothioindigo, tetramethyldichlorothioindigo, 7.7′-dimethyl-4.4′-dichlorothioindigo, 7.7′ - dimethyl-5.5′-dichlorothioindigo, 7.6′-dichloro-4′.7′-dimethylthioindigo, etc., the azo group, azo coupling pigment and azo condensation pigment such as, 3.5-dichlorobenzene-azo-β-naphthol, 2 - methoxy-5-benzoylaminobenzene-azo-2-hydroxy-3-naphthoic acid anilide, 3.5-dichlorobenzene-azo-2-hydroxy-3-naphthoic acid anilide, m-trifluoro-methyl-p-chlorobenzene-azo - 2 - hydroxy-3-naphthoic acid anilide, 2.5-diethoxy - 4 - benzoylamino-benzene-azo-2-hydroxy-3-naphthoic acid anilide, 3.3′-dimethoxydiphenyl-disazo-bis-(1) - naphthalene, diphenyl-disazo-bis-acetoacet anilide, bis-(3.5-dichlorobenzene-azo-acetoacetic-o-toluidide), bis-(3.5 - dichlorobenzene-azo-2-hydroxy-3-naphthoic-acid-o-chloro anilide, and the like.

Chromogens which have water-solubilizable radicals in themselves and which are directly bonded to the polymer may suitably include a chromogen-containing sulfonic acid radical or carboxylic acid radical on the above-mentioned chromogen, such as cyclic group and other heterocyclic group, for example, disulfonated flavanthrone, disulfonated phthaloperinone, 2.4.6-tris-[8-sulfonated - anthraquinyl-(1)-amino]-s-triazine, disulfonated carbazole dioxazine, disulfonated quinacridone, etc., azo group such as, for example, 3.5-dichlorobenzene-azo-1-naphthol - 3 - sulfonic acid, benzene - azo - 2 - naphthol-6.8 - disulfonic acid, 4 - (3.5 - dichlorobenzene - azo)-1 - (p - sulfophenyl) - 3 - methyl - 5 - hydroxy - pyrazol, 3.3′ - dimethoxy - diphenyl - disazo - bis - 1 - naphthol-3-sulfonic acid and the like.

Typical further amino compounds and classes which may be included in the above may be diaminoanthrapyrimidine, triaminoflavanthrone, diaminodibromoanthanthrone, triaminopyranthrone, diaminoperylene vermilion, aminoperylene scarlet, diaminophthaloperinone, mono-amino acridone red, triamino oxazole red, triamino isoviolanthrone, diaminoquinacridone, diamino dichloro-quinacridone, triaminocarbazole dioxazine, 2.6-bis-[4-amino - anthraquinonyl - (1) - amino] - 4 - (p - amino-phenoxy) - s - triazine, 2.4.6 - tris - [4 - amino - anthra-quinonyl - (1) - amino] - s - triazine, diamino vat orange GR, triamino indanthrone, 2.4.6 - tris[4 - (p-amino - benzoicamido) - anthraquinonyl - (1) - amino]-s-triazine etc., in the cyclic group and other heterocyclic group; diaminoindigo, dichlorodiaminothioindigo, tetramethyldichlorodiaminothioindigo, 7.7′ - dimethyl - 4.4′-dichloro - 5.5′ - diaminothioindigo, 7.7′ - dimethyl - 5.5′-dichloro - 4.4′ - diaminothioindigo, 7.6′ - dichloro - 4′.7′-dimethyl - 5.5′ - diaminothioindigo, etc., in the indigo group; 3.5 - dichloro - 4 - aminobenzene - azo - β - naphthol, 3.5 - dichloro - 4 - aminobenzene - azo - 2 - hydroxy-3 - naphthoic acid - 4′ - amino anilide, 2 - methoxy - 5-benzoylaminobenzene - azo - 2 - hydroxy - 3 - naphthoic acid - 4′ - aminoanilide, 3.5 - dichloro - 4 - aminobenzene-azo - 2 - hydroxy - 3 - naphthoic acid - 3′ - aminoanilide, 3 - trifluoromethyl - 4 - chlorobenzene - azo - 2 - hydroxy-3 - naphthoic acid - 3′ - aminoanilide, 2.5 - diethoxy - 4-benzoylaminobenzene - azo - 2 - hydroxy - 3 - naphthoic acid - 3′ - aminoanilide, 3.3′ - dimethoxydiphenyl - disazo-bis - 4 - aminonaphthalene, diphenyl - disazo - bis - (3' - amino) - acetoaceto anilide, bis - (3.5 - dichloro - 4 - aminobenzene - azo - acteoacetic - o - toluidine), bis-(3.5 - dichloro - 4 - aminobenzene - azo - 2 - hydroxy - 3 - naphthoic acid - o - chloro anilide), etc., in the azo group and compounds containing a sulfonic acid radical or carboxylic acid radical on the above amino compounds, such as diamino disulfonated flavanthrone, diaminodisulfonated phthaloperinone, 2.4.6 - tris - [4 - amino - 8 - sulfonated anthraquinonyl - (1) - amino] - s - triazine, diamino disulfonated carbazole dioxazine, diamino disulfonated quinacridone, etc., in the cyclic dye group and other heterocyclic dye group; 3.5 - dichloro - 4 - aminobenzene - azo - 1 - hydroxy - 6 - aminonaphthalene - 3 - sulfonic acid, m - aminobenzene - azo - 2 - naphthol - 6.8 - disulfonic acid, 4 - (3.5 - dichloro - 4 - aminobenzene - azo) - 1 - (p - sulfophenyl) - 3 - methyl - 5 - hydroxy - pyrazol, 3.3' - dimethoxy - diphenyl - diazobis - 1 - naphthol - 7 - amino - 3 - sulfonic acid and the like.

The above set forth chromogens may be conveniently tabulated as immediately following hereinbelow into divisions, subdivisions and subgroups of the subdivisions. The tabulation also sets forth typical examples of chromogen which fall within these groups and subgroups.

| Division | Subdivision | Subgroup | Compound |
|---|---|---|---|
| I Non-sulfonated homocyclic chromogen-containing amino compound. | Homocyclic indanthrene-containing amino compound. | | (1) Triaminoisoviolanthrone; (2) Reduced product of indanthrene Black B; B (3) Indathrene rubine CR. |
| II Non-sulfonated heterocyclic chromogen-containing amino compound. | (1) Non-sulfonated heterocyclic indanthrene-containing amino compound. | (a) Perinone-containing amino compound. | (1) Diaminophthaloperinone orange; (2) Diaminophthaloperinone red; (3) Triamino vat orange GR. |
| | | (b) Perylene-containing amino compound. | (1) Diamino perylene vermillion; (2) Amino derivative of indanthrene scarlet BL. |
| | | (c) Flavanthrone-containing amino compound. | Triaminoflavanthrone yellow. |
| | | (d) Pyrimidine-containing amino compound. | Aminated indanthrene yellow 4GF. |
| | | (e) Indanthrone-containing amino compound. | Indanthrene green BB. |
| | (2) Non-sulfonated amino quinacridone. | | Diaminoquinacridone. |
| | (3) Non-sulfonated amino dioxazine. | | Triamino carbazole dioxazine, violet. |
| | (4) Non-sulfonated s-triazine type heterocyclic chromogen-containing amino compound. | | (1) 2.4.6-bis-(4-amino-anthraquinonyl-(1)-amino)-6-(p-amino-phenoxy)-s-triazine; (2) 2.4.6-tris-(4-amino-anthraquinonyl-(1)-amino)-s-triazine; (3) 2.4.6-tris[4-(amino-benzamido) anthraquinonyl-(1)-amino]-s-triazine; (4) 2.4.6-tris-[3-chloro-amino-anthraquinonyl-(2)-amino]-s-triazine. |
| | (5) Non-sulfonated amino metal phthalocyanine. | | (1) Diamino copper phthalocyanine blue; (2) Tetraamino nickel phthalocyanine blue; (3) Pentaamino copper phthalocyanine black. |
| III Sulfonated heterocyclic chromogencontaining amino compound. | (a) Sulfonated aminoindanthrene group. | | (1) Diaminodisulfonated phthaloperinone. |
| | (b) Sulfonated amino metal phthalocyanine. | | (2) Diaminodisulfonated flavanthrone Monoamino sulfonated cobalt phthalocyanine blue. |
| IV Indigo type chromogen-containing amino compound | Amino Indigo group | | Diamino Indigo. |
| V(a) Non-sulfonated azo type chromogen-containing amino compound. | (a) Amino derivative of azo aryl-2-hydroxynaphthoicarylide type chromogen. | | (1) Amino derivative of azo pigment having the formula |

| Division | Subdivision | Subgroup | Compound |
|---|---|---|---|
| | | (2) Amino derivative of azo pigment having the formula | [structure: HO—CONH—phenyl-NH₂; naphthalene—N=N—phenyl(CF₃)(Cl)] |
| | | (3) Amino derivative of azo pigment having the formula | [structure containing OC₂H₅, CONH, OH, N=N, NH₂ groups] |
| | (b) Amino derivative of tetrazo-diphenyl-bis-aryl type chromogen. | Amino derivative of azo pigment having the formula | [structure: H₂N—naphthalene—N=N—phenyl(OCH₃)—phenyl(OCH₃)—N=N—naphthalene—NH₂] |
| | (c) Amino derivative of diazoaryl-acetoacetyl arylide type chromogen. | Amino derivative of azo pigment having the formula | [structure: H₂N—phenyl(Cl)(Cl)—N=N—CH(COCH₃)—CONH—phenyl(CH₃)—phenyl(CH₃)—CONH—CH(COCH₃)—N=N—phenyl(Cl)(Cl)—NH₂] |

| Division | Subdivision | Subgroup | Compound |
|---|---|---|---|
| | (d) Azoaryl pyrazolone type chromogen-containing amino compound. | | Amino derivative of azo pigment having the formula 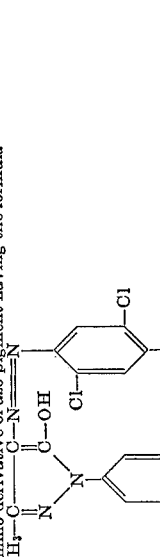 |
| | (e) Amino derivative of oil dye type chromogen. | | Oil black. |
| V(b) Sulfonated azo type chromogen-containing amino compound. | | Amino derivative of tetrazo diphenyl-bis-sulfo-aryl type chromogen. | Amino derivative of azo dye having the formula 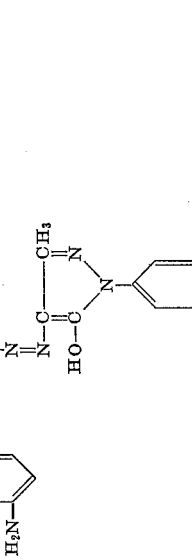 |

Monomers that are addition-polymerizable and that can be used in the process of the invention are, for example, vinyl formate, vinyl acetate, vinyl chloroacetate, vinyl propionate, vinyl stearate, vinyl oleate, vinyl benzoate, vinyl chloride, vinylidene chloride, methyl vinyl ketone, styrene, methyl styrene, chlorostyrene, vinyl phenol, nitrostyrene, aminostyrene, acrylic acid, methacrylic acid, crotonic acid, itaconic acid, maleic acid, fumaric acid, monomethyl itaconate, monoethyl itaconate, monobutyl itaconate, monohexyl itaconate, monomethyl maleate, monoethyl maleate, monobutyl maleate, monomethylfumarate monoethylfumarate, monobutylfumarate, maleic anhydride, methyl acrylate, methyl methacrylate, methyl crotonate, dimethyl itaconate, dimethylmaleate, dimethylfumarate, ethyl acrylate, ethyl methacrylate, ethyl crotonate, diethyl itaconate, diethyl maleate, diethyl fumarate, propylacrylate, propylmethacrylate, propylcrotonate, butylacrylate, butylmethacrylate, butyl crotonate, dibutyl itaconate, dibutyl maleate, dibutylfumarate, amyl acrylate, amyl methacrylate, diamyl itaconate, hexylacrylate, hexylmethacrylate, hexylitaconate, octylacrylate, octylmethacrylate, octylcrotonate, dioctylitaconate, dioctylmaleate, dioctylfumarate, lauryl acrylate, lauryl methacrylate, lauryl crotonate, dilauryl itaconate, stearyl acrylate, stearylmethacrylate, distearylitaconate, methyl $\alpha$-chloroacrylate, ethyl $\alpha$-chloroacrylate, ethyleneglycolmonoacrylate, ethyleneglycolmonomethacrylate, ethyleneglycolmonocrotonate, ethyleneglycolmonoitaconate, ethyleneglycoldiacrylate, ethyleneglycoldimethacrylate, ethyleneglycol diitaconate, polyethyleneglycolmonoacrylate, polyethyleneglycolmonomethacrylate, polyethyleneglycolmonoitaconate, polyethyleneglycoldiacrylate, polyethyleneglycoldimethacrylate, propyleneglycolmonoacrylate, propyleneglycolmonomethacrylate, propyleneglycolmonoitaconate, propyleneglycoldiacrylate, propyleneglycoldimethacrylate, polypropyleneglycolmonoacrylate, polypropyleneglycolmonomethacrylate, polypropyleneglycolmonoitaconate, polypropyleneglycoldiacrylate, polypropyleneglycoldimethacrylate, propanediolmonoacrylate, propanedioldimethacrylate, propanediolmonomethacrylate, propane dioldiacrylate, propanedioldimethacrylate, butanediolmonoacrylate, butanediolmonomethacrylate, butanedioldiacrylate, butanedioldimethacrylate, glycidylacrylate, glycidylmethacrylate, glycidylcrotonate, glycidylmonoitaconate, glycidylmonomaleate, glycidylmonofumarate, diglycidylitaconate, $\beta$-hydroxy-$\gamma$-chloro-n-propyl acrylate, $\beta$-hydroxy-$\gamma$-chloro-n-propyl methacrylate, mono-$\beta$-hydroxy-$\gamma$-chloro-n-propyl itaconate, di-$\beta$-hydroxy-$\gamma$-chloro-p-propylitaconate, allyl acrylate, allyl methacrylate, N.N'-di-methylamino ethyl acrylate, N.N-dimethylamino ethyl methacrylate, acrylic chloride, methacrylic chloride, crotonic chloride, itaconic chloride, acrolein, methacrolein, crotonic aldehyde, itaconic aldehyde, acrylonitrile, methacrylonitrile, crotonic nitrile, itaconic nitrile, acrylamide, N-methyl acrylamide, methacrylamide, N-methyl methacrylamide, crotonic amide, itaconic diamide, itaconic monoester monoamide, itaconic monoacid monoamide, maleic amide, fumaric amide, N-methylol acrylamide, N-methylol methacrylamide, N-methylolcrotonic amide, N-methylolitaconic amide, N.N'- dimethylol itaconic amide, N-methylol maleic amide, N-methylol fumaric amide, N-methylmethylolacrylamide, N-methylmethylolmethacrylamide, N-methylmethylolcrotonic amide, N-methylmethylolitaconic amide, N.N'-dimethylmethylolitaconicdiamide, N-methylmethylol maleic amide, N-methylmethylolfumaric amide, N-ethylmethylolacrylaide, N-ethylmethylolmethacrylamide, N.N'-diethylmethylolitaconicdiamide, N - ethylmethylolitaconicmonoamide, N-propylmethylolacrylamide, N-propylmethylol methacrylamide, N-propylmethylolitaconic amide, N-butylmethylolacrylamide, N-butylmethylolmethacrylamide, N-butylmethylolcrotonic amide, N-butylmethylolitaconicmonoamide, N.N'-dibutylmethylolitaconicdiamide, N-butylmethylolmaleic amide, N-butylmethylolfumaric amide, N-sulfomethylolacrylamide, N-sulfomethylolmethacrylamide, N-sulfomethylolcrotonic amide, N-sulfomethylolitaconicmonoamide, N.N'-disulfomethylolitaconicdiamide, N-sulfomethylolmaleic amide, N-sulfomethylolfumaric amide, N.N'-methylene-bis-acrylamide, N.N'-methylene-bis-methacrylamide, acrylic azide, methacrylic azide, crotonic azide, itaconic azide, acrylethylene imide, methacryl ethylene imide, crotonic ethylene imide, itaconic ethylene imide, N-sulfonethylacrylimide, N-sulfonethylmethacrylimide, N-sulfoethylcrotonic imide, N-sulfonethylitaconic imide, N-carboxyethyleneacrylimide, N-carboxyethylenemethacrylimide, N-carboxyethylene crotonic imide, N-carboxyethylene itaconic imide, vinyl isocyanate, propenylisocyanate, vinyl urea, propenyl urea, vinyl phenyl urethane, propenyl phenyl urethane, vinyl ethylene urea, propenyl ethylene urea, 3.5-dichloro-1-vinyl-s-triazine, 3-chloro-5-amino-1-vinyl-s-triazine, 3.5-diamino-1-vinyl-s-triazine, 3.5-diethyleneimino-1-vinyl-s-triazine, N-methylol vinyl urea, N.N-dimethylolvinyl urea, N-methylol propenyl urea, N.N-dimethylol propenyl urea, N.N'-dimethylol-3.5-diamino-1-vinyl-s-triazine, N.N.N'.N'-tetramethylol-3.5-diamino-1-vinyl-s-triazine, N-methylmethylol vinyl urea, N.N-dimethylmethylol vinyl urea, N-methylmethylol propenyl urea, N.N-dimethylmethylol propenyl urea, N.N'-dimethylmethylol-3.5-diamino-1-vinyl-s - triazine, N.N.N'.N' _ tetramethyl methylol-3.5-diamino-1-vinyl-s-triazine, N-ethylmethylol vinyl urea, N.N-diethylmethylol vinyl urea, N-ethylmethylol propenyl urea, N.N-diethylmethylol propenyl urea, N.N'-diethylmethylol-3.5-diamino - 1 - vinyl - s - triazine, N.N.N'.N'-tetraethylmethylol-3.5-diamino-1-vinyl - s - triazine, N-propylmethylolvinyl urea, N.N'-dipropylmethylol-3.5-diamino-1-vinyl-s-triazine, N-butylmethylol vinyl urea, N.N-dibutylmethylolvinyl urea, N-butylmethylol propenyl urea, N.N'-dibutylmethylol propenyl urea, N.N'-dibutylmethylol-3.5-diamino-1-vinyl-s-triazine, N.N.N'.N'-tetrabutylmethylol-3.5-diamino-1-vinyl-s-triazine, N-sulfomethylol vinyl urea, N.N-disulfomethylol vinyl urea, N-sulfomethylol propenyl urea, N.N-disulfomethylol propenyl urea, N.N'-disulfomethylol-3.5-diamino-1-vinyl-s-triazine, N.N.N'.N' - tetrasulfomethylol - 3.5 - diamino-1-vinyl-s-triazine, N-sulfonethyl vinyl urea, N-sulfonethyl propenyl urea, N.N'-disulfonethyl-3.5-diimino-1-vinyl-s-triazine, N-carboxyethylene vinyl urea, N-carboxyethylene propenyl urea, N.N'-dicarboxyethylene-3.5-diimino-1-vinyl-s-triazine, allyl acetate, allyl methyl ether, allyl butyl ether, allyl glycidyl ether, allyl β-hydroxy-γ-chloro-n-propyl ether, butadiene, isoprene, chloroprene, vinyl dimethyl amine, vinyl diethyl amine, vinyl carbazole, N-vinyl succinimide, N-vinyl phthalimide, N-vinyl caprolactum, N-vinyl pyrrolidone, 2-vinyl-5-methyl pyridine, vinyl sulfonic acid, and the like.

Polymerization can be carried out by mixing one or more types of monomers without any regard to ratio of each type of monomer. The properties of the polymer portion in the chromogen-bonded-polymer are derived from those of the mixed monomers of various types, i.e., active-reactive, weakly-reactive or non-reactive, or water- or oil-dispersible, also depending upon the ratio of each type of monomer. Such polymerization can be carried out by any of the known methods of addition-polymerization such as, solution-, block, emulsion-, and suspension-polymerizations.

The aforementioned addition-polymerizable monomers may be largely divided into three groups according to the reactivity of the radicals thereof:

(1) active-reactive monomer group
(2) weakly-reactive monomer group
(3) non-reactive monomer group (1) The active-reactive monomer group is the group of addition-polymerizable monomers which has at least one active-reactive radical in its structure and, after polymerization reaction, can introduce into the chromogen-bonded-polymer the radicals capable of linking with themselves and other radicals of crosslinking agent, precondensate of a thermosetting resin, reactive high polymer or reactive latex.

The hereinbelow set forth tabulation is a list of some examples of suitable active-reactive radicals:

| Names of radicals | Structure |
|---|---|
| Methylol | $-CH_2OH$ |
| Alkylmethylol | $-CH_2OR$ ($R = CH_3, -C_2H_5, -C_3H_7, -C_4H_9$, etc.) |
| Sulfomethylol | $-CH_2-SO_3H$ |
| Epoxy | $-CH-CH_2$ with $O$ bridge |
| Chlorohydrin | $-CH-CH_2$ with $OH$ and $Cl$ |
| Ethyleneimide | $-CON\begin{smallmatrix}CH_2\\ \\CH_2\end{smallmatrix}$ |
| N-sulfonethyleneimide | $-CONHCH_2CH_2SO_3H$ |
| Ethylene urea | $-NHCON\begin{smallmatrix}CH_2\\ \\CH_2\end{smallmatrix}$ |
| N-sulfonethylene urea | $-NHCONHCH_2CH_2SO_3H$ |
| Acid chloride | $-COCl$ |
| Chlorotriazine | chlorotriazine ring with Cl, or with $NH_2$ |

| Names of radicals | Structure |
|---|---|
| Ketene | —CH=C=O |
| Aldehyde | —CHO |
| Vinyl | —CH=CH₂ |
| Isocyanate | —N=C=O |
| Acid azide | —CON₃ |
| Phenyl urethane | —NHCOO—⟨phenyl⟩ and the like. |

(2) The weakly-reactive monomer group is the group of addition-polymerizable monomers which has at least one weakly-reactive radical in its structure and, after polymerization reaction, can introduce into the chromogen-bonded-polymer the radicals incapable of linking with themselves under ordinary crosslinking conditions but are capable of linking with active-reactive radicals derived from other comonomers, or with active-reactive radicals of a crosslinking agent, precondensate of a thermosetting resin and the like, and also can introduce the active-reactive radicals into the chromogen-bonded-polymer after polymerization by reacting with a material having at least two active-reactive radicals in its structure such as formaldehyde, glyoxal, epichlorohydrin, dichlorohydrin, cyanuricchloride, dimethylol urea, tetramethylol melamine, hexamethylol melamine, or precondensates of ordinary thermosetting resins and the like.

The hereinbelow set forth tabulation is a list of some examples of suitable weakly-reactive radicals:

| Names of radicals: | Structure |
|---|---|
| Hydroyl | —OH |
| Mercapto | —SH |
| Amino | —NH₂ |
| Imino | —NH— |
| Carboxyl | —COOH |
| Carboamide | —CONH₂, —CONH— |
| Sulfoamide | —SO₂NH₂, —SO₂NH— |
| Urea | —NHCONH₂, —NHCONH— |
| Ureido | —CONHCONH— |
| Urethane | —OCONH— |
| Nitrile | —CN | and the like.

(3) The non-reactive monomer group is the group of addition-polymerizable monomers which has at least one non-reactive radical in its structure and, after polymerization reaction, can introduce into the chromogen-bonded-polymer the radicals incapable of linking with themselves and other reactive radicals under ordinary crosslinking conditions.

The hereinbelow set forth tabulation is a list of some examples of suitable non-reactive radicals:

| Names of radicals | Structure |
|---|---|
| Alkyl ester | —OCOR, —COOR (R: —CₙH₂ₙ₊₁ n:1, 2, 3, 4, 5, 6, 7, 8, 9, 10, 11, 12, 13, 14, 15, 16, 17, 18). |
| Aryl ester | —OCOAr, —COOAr (Ar: —C₆H₅, —C₇H₇, —C₁₀H₇). |
| Alicyclic | ⟨H⟩ |
| Aryl | ⟨phenyl⟩-R, etc. | and the like.

According to the classification set forth hereinabove, the addition-polymerizable monomers which are used in the present invention are divided into groups, as follows:

(1) Active-reactive monomer group:

(a) Active-reactive and water-soluble or -dispersible monomer group

N-methylol acrylamide, N-methylol methacrylamide, N-methylol crotonic amide, N-methylol itaconic amide, N,N'-dimethylol itaconic amide, N-methylol maleic amide, N-methylol fumaric amide, N-methylol vinyl urea, N,N-dimethylol vinyl urea, N,N'-dimethylol-3.5-diamino-1-vinyl-s-triazine, N-methylmethylol acrylamide, N-methylmethylolmethacrylamide, N-methylmethylol crotonic amide, N-methylmethylol itaconic amide, N,N'-dimethylmethylol itaconic amide, N-methylmethylol maleic amide, N-methylmethylol fumaric amide, N-methylmethylol vinyl urea, N,N-dimethylmethylol vinyl urea, N,N'-dimethylmethylol-3.5-diamino-1-vinyl-s-triazine, N-ethylmethylolacrylamide, N-ethylmethylolmethacrylamide, N-ethylmethylol crotonic amide, N-ethylmethylol itaconic amide, N-ethylmethylol vinyl urea, N,N'-diethylmethylol-3.5-diamino-1-vinyl-s-triazine, and the like, N-propylmethylol acrylamide, N-propylmethylol methacrylamide, N-propylmethylol itaconic amide, N-propylmethylol vinyl urea, N,N'-dipropylmethylol-3.5-diamino-1-vinyl-s-triazine, and the like, N-sulfomethylolacrylamide, N-sulfomethylolmethacrylamide, N-sulfomethyl crotonic amide, N-sulfomethyl itaconic amide, N-sulfomethyl maleic amide, N-sulfomethylfumaric amide, N-sulfomethyl vinyl urea, N,N'-disulfomethyl-3.5-diamino-1-vinyl-s-triazine, acrylic azide, methacrylic azide, N-sulfonethyl acrylimide, N-sulfonethylmethacrylimide, N-carboxyethyl acrylimide, N-carboxyethylmethacrylimide, and the like, acrolein, and the like.

(b) Active-reactive and oil-soluble or -dispersible monomer group

Acrylic chloride, methacrylic chloride, crotonic chloride, itaconic chloride, maleic anhydride, acrylethyleneimide, methacryl ethyleneimide, crotonic ethyleneimide, itaconic ethyleneimide, N-butylmethylol acrylamide, N-butylmethylolmethacrylamide, N-butylmethylol vinyl urea, N,N'-dibutylmethylol-3.5-diamino-1-vinyl-s-triazine, glycidyl acrylate, glycidyl methacrylate, glycidyl crotonate, glycidyl itaconate, β-hydroxy-γ-chloro-n-propylacrylate, β-hydroxyl-γ-chloro-n-propyl methacrylate, β-hydroxy-γ-chloro-n-propyl itaconate, ethyleneglycoldiacrylate, ethyleneglycoldimethacrylate, ethyleneglycoldiitaconate, allyl glycidyl ether, allyl β-hydroxy-γ-chloro-n-propyl ether, vinyl isocyanate, propenyl isocyanate, vinyl phenyl urethane, propenyl phenyl urethane, vinyl ethylene urea, propenyl ethyleneurea, 3.5-dichloro-1-vinyl-s-triazine, 3-chloro-5-amino-1-vinyl-s-triazine, 3.5-diethyleneimino-1-vinyl-s-triazine, N,N'-methylenebis-acrylamide, N,N'-methylenebis-methacrylamide, methacrolein, crotonic aldehyde, itaconic aldehyde, allyl acrylate, allyl methacrylate, ethyleneglycoldiacrylate, ethyleneglycoldimethacrylate, ethyleneglycoldiitaconate, polyethyleneglycoldiacrylate, polyethyleneglycoldimethacrylate, propanedioldiacrylate, propanedioldimethacrylate, polypropyleneglycoldiacrylate, polypropylene-glycoldimethacrylate, butanedioldiacrylate, butanedioldimethacrylate, and the like.

(2) Weakly-reactive monomer group:

(a) Weakly-reactive and water-soluble or -dispersible monomer group

Acrylic acid, methacrylic acid, crotonic acid, itaconic acid, maleic acid, fumaric acid, acrylamide, methacrylamide, crotonic amide, itaconic diamide, itaconic monoamide, maleic diamide, maleic monoamide, fumaric amide, ethyleneglycolmonoacrylate,
ethyleneglycolmonomethacrylate,
polyethyleneglycolmonoacrylate,
polyethyleneglycolmonomethacrylate,
polyethyleneglycolmonoitaconatemonoamide,
polyethyleneglycolmonofumaratemonoamide,
and N-vinyl urea, and the like, (b) Weakly-reactive and oil-soluble or -dispersible monomer group Monomethyl itaconate, monomethylmaleate, monoethyl itaconate, monobutyl itaconate, propanediolmonoacrylate, propanediolmonomethacrylate, propanediolmonoitaconate, propanediolmonomaleate, polypropylene glycolmonoacrylate, polypropyleneglycolmonomethacrylate,
butanediolmonoacrylate,
butanediolmonomethacrylate,
butanediolmonoitaconate, acrylonitrile, methacrylonitrile, crotonic nitrile, itaconic nitrile, and the like.

(3) Non-reactive monomer group:

(a) Non-reactive and water-soluble or dispersible monomer group

N-vinyl pyrrolidone, 2-vinyl-5-methyl pyridine.

(b) Non-reactive and oil-soluble or -dispersible monomer group

Methyl acrylate, methylmethacrylate, methyl crotonate, dimethyl itaconate, dimethyl maleate, methyl fumarate, ethyl acrylate, ethylmethacrylate, ethyl crotonate, diethyl itaconate, ethylmaleate, ethyl fumarate, propyl acrylate, propylmethacrylate, propyl itaconate, butyl acrylate, butyl methacrylate, butyl itaconate, butyl maleate, butyl fumarate, hexyl acrylate, hexyl methacrylate, hexyl itaconate, octyl acrylate, octyl methacrylate, octyl crotonate, octyl itaconate, octyl maleate, octyl fumarate, lauryl acrylate, lauryl methacrylate, lauryl itaconate, stearyl acrylate, stearyl methacrylate, stearyl itaconate, vinyl acetate, vinyl propionate, vinyl stearate, styrene, vinyl toluene, vinyl chloride, vinylidene chloride, methyl vinyl ketone, N-vinyl-ε-caprolactam, N-vinyl phthalimide, butadiene, isoprene, and chloroprene.

However, if the polymer contains the aforementioned reactive radicals, which are in themselves solubilizable or dispersible, then the solubilizing or dispersible radical need not be included. For a hydrophilic radical solubilizable or dispersible in water, at least one polar radical is properly selected from anionic, nonionic and cationic hydrophilic radicals according to the object to be performed by coloring matter. As typical thereof, there can be enumerated such anionic hydrophilic radicals as carboxyl (—COOH), sulfate (—OSO₃H), and sulfo (—SO₃H) radicals, such nonionic hydrophilic radicals as hydroxyl (—OH), ether (—O—) and carboamide (—CONH₂) radicals and such cationic hydrophilic radicals as amino (—NH₂), imino (—NH—), tertiary amino

and pyridine

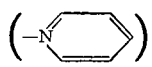

radicals. For a hydrophobic radical solubilizable or dispersible in oil there is properly selected at least one nonpolar group from aliphatic hydrocarbon radicals having 2 to 18 carbon atoms and esters, ether, carboamide, sulfoamide, urea and urethane condensates thereof according to the use desired of the aforesaid coloring matter.

Processes in accordance with the invention for making a chromogen-bonded-polymer having a hydrophilic or hydrophobic radical may include the following:

(1) Introduction of water-solubilizable or dispersible radicals (A) Introduction of anionic hydrophilic radicals (a) A carboxyl radical is introduced by using chloroacetic acid.
(b) A sulfo radical is introduced by using sodium bisulfite.
(c) A sulfonyl radical is introduced by using sulfamic acid.

(B) Introduction of nonionic hydrophilic radicals (a) A polyether type radical is introduced by using ethylene oxide.
(b) A polyalcohol type radical is introduced by using glycerine or glycidol.

(C) Introduction of cationic hydrophilic radicals (a) An amino or imino radical is introduced by using a lower amine.
(b) A pyridinium radical is introduced by using pyridine hydrochloride.
(c) An imino radical is introduced by using ethylene imine.

(2) Introduction of oil-solubilizable or dispersible radicals.

By using a reactive compound having such hydrophobic hydrocarbon radical as, for example, a higher aliphatic, or aromatic-amine, -alcohol, -carboamide, -methylol carboamide, -isocyanate, -urea, -urethane or ethylene urea or a phenolic derivative, the aforesaid hydrocarbon radical is introduced.

The introduction of the solubilizing or dispersing radical into the chromogen-bonded-polymer enables it to be used in many different ways depending upon the nature of the radical introduced thereinto.

The chromogen-bonded-polymer of the present invention can be utilized for different uses depending on the kind of the solubilizable or dispersible radical contained therein, i.e., the chromogen-bonded-polymer into which there is introduced a hydrophilic radical can be extensively utilized as a material similar to a dye in such conventional uses of dyes as dyeing fibrous materials. The polymer into which there is introduced a hydrophobic radical can be also extensively utilized, as a coloring material for paints and printing inks in the conventional uses of pigments.

This is because the chromogen-bonded-polymer of the invention, having in its structure radicals solubilizable or dispersible respectively in water, organic solvents, plasticizers or other vehicles, can be easily dissolved or finely dispersed in such vehicles by merely being mixed and stirred therein. In the case of a chromogen-bonded-polymer having reactive radicals in its structure by using an after-treatment such as heating, addition of a catalyst or a heavy metal or variation of pH, the reactive (functional) radicals of the chromogen-bonded-polymer will be made to react with each other or with the vehicle so that the polymer may be crosslinked to be of a higher molecular weight. Thus, its resulting solubilizability or dispersibility will be so negligible as compared with the molecular weight of the crosslinked polymer that it will be able to be made insoluble.

In the case of using the coloring agent provided in this invention for ball-point pen ink, stamp pad ink, cosmetics and soaps, such agent will be stable for long storage periods and the solubility thereof is excellent if the chromogen-bonded-polymer has weakly-reactive and/or non-reactive radicals, most desirably only non-reactive radicals. Useful chromogen-bonded-polymers will be produced by utilizing the properties of the solubilizable radical of the addition-polymerizable monomer.

For example, the coloring agent for a ball-point pen ink is required to possess high solubility and the property of not bleeding in fatty oil.

Accordingly, since the polymer portion will become polymethyl methacrylate, for example, if methyl-methacrylate is used as an addition-polymerizable monomer, the chromogen-bonded-polymer will be soluble in esters, ketones, benzyl alcohol, etc., and will not bleed in fatty oil.

Such advantageous properties are not possessed by any known oil-soluble dye.

As for a coloring agent for inner coloring of a synthetic resin and a synthetic fiber, if there is selected an addition-polymerizable monomer in the making of the chromogne-bonded-polymer which polymerizes into a material having the same properties as the resin or fiber, or which has affinity therewith, their physical and chemical properties coincide at least to some extent. In such situation, it is desirable to color such resin or fiber material and the latter material will not be destroyed in the coloring.

Thus, if chromogen-bonded-polymer in which the polymer portion is polyacrylonitrile, is utilized for dope dyeing of polyacrylonitrile yarn, a colored yarn will be obtained without changing the conditions of spinning.

The effects of coloring articles and materials with the chromogen-bonded-polymer having solubilizing or dispersing radicals as compared with those of conventional dyes and pigments is explained as follows:

The chromogen-bonded-polymers which have radicals solubilizable or dispersible in oil, for example, have such high dispersibility in solvents and varnishes that when they are utilized as a paint or ink, for example, they will be transparent, high in concentration and have good spreadability. If the chromogen-bonded-polymers also have the aforesaid reactive radicals, the latter will crosslink to each other or to a functional radical of an article being coated with the chromogen-bonded-polymer upon an after-treatment of the coated article. If the chromogen-bonded-polymer is used to color the interiors of synthetic resins and synthetic fibers and a dispersible radical high in compatibility with the resins and/or fibers is present in the chromogen-bonded-polymer, the latter chromogen-bonded-polymer will be high in dispersibility and tinting strength, will cause no migration and will not deleteriously reduce the normal physical and electrical characteristics of such resins and fibers.

In coloring with conventional water-soluble coloring material such as known reactive dyes, the chromogens in these dyes are generally chosen to have a functional radical which is believed to covalently bond with a functional radical of the material, such as a fibrous substance, to be bonded to color the material. In this situation, a reactive dye which has been hydrolyzed with the water medium or a reactive dye which has lost its functional radicals through reaction with a sizing material, for example, will no longer be able to react with the material to be colored thereby reducing fastness of color. Furthermore, conventional dyes having a radical such as a sulfo or carboxyl radical in their chromogen, if not sufficiently applied to a fabric material, for example, will again dissolve or disperse in water when the dyed materials are washed and will stain white and light colored portions of the material. Even where sufficient dye has been applied, variations in pH or other conditions may result in a varying of the hue.

By contrast, when the chromogen-bonded-polymer produced in accordance with the invention has present therein reactive radicals and a radical solubilizable or dispersible in water and such chromogen-bonded-polymer is caused to permeate materials such as fibrous materials in a state having affinity with water and then the reactive radicals are caused to crosslink with each other or to react with the functional radical or radicals of the materials in an after-treatment of the materials coated with the chromogen-bonded-polymer such as by heating or by pH variation, the chromogen-bonded-polymer will readily be crosslinked to a higher polymer. The resulting higher polymer is necessarily so insoluble and stable within the coated materials that, even if the materials are washed with hot water, acid or alkali, the color on the material remains fast. Thus, it has been found that the crosslinked chromogen-bonded-polymer produced by the after-treatment is so high in its fixing ratio, abrasion resistance and other characteristics of fastness that not only cotton, and other cellulose fibers such as viscose rayon and acetate rayon fibers but also wool and such synthetic fibers as polyester, polyamide, polyacrylonitrile and polyvinyl formal fibers can be uniformly dyed with it.

Where solutions for producing fibers, papers and nonwoven fabrics are colored with a conventional coloring material, dye, etc., the coloring material will act as an impurity and will deleteriously affect physical properties of the colored objects by reducing, for example, their tensile strength and tearing, bending and abrasion resistance. By contrast, the chromogen-bonded-polymer of the invention enhances such properties.

In addition, it has been found that when materials and articles such as papers, textiles, leathers, wooden articles, hard boards, concrete walls, metal plates, glass plates and the like are colored with the chromogen-bonded-polymer of the invention while simultaneously being resin treated, they are advantageously endowed with the desirable property of proof against stain and water, fire and moth damage.

The following examples will serve to illustrate the invention. However, it is to be understood that it is not intended to limit the scope of the invention thereto. The word "parts" appearing in the examples is intended to signify parts by weight.

EXAMPLE 1

A quantity of 5 parts of 2.4.6-tris-[4-amino-anthraquinonyl - (1) - amino-]-s-triazine paste (measured by weight as a dried solid) was thoroughly mixed with 150 parts of 35% aqueous hydrochloric acid solution. The solution was kept at 0–2° C. in an ice bath and diazotized for 30 minutes by the addition of 1.7 parts of sodium nitrite. Thereafter, 3 parts of zinc chloride were added to obtain the chromogen-containing stabilized diazonium salt. After salting out and filtering, the chromogen-containing stabilized diazonium salt paste was obtained.

A mixture was then formulated as follows:

| | Parts |
|---|---|
| A 15% paste containing the thus-obtained stabilized diazonium salt | 30 |
| Acrylamide | 7 |
| Methyl acrylate | 3 |
| Water | 100 |
| | 140 |

When this solution was kept at a room temperature and then heated to 80° C. for 3 hours, polymerization occurred with the evolution of foams. The end point of the polymerization was fixed at a point where no further foaming occurred.

After polymerization, 300 parts of methyl alcohol were added to precipitate the chromogen-bonded-polymer. The chromogen-bonded-polymer powder was obtained by filtering, washing with 50 parts of methyl alcohol and drying in open air.

EXAMPLE 2

A quantity of 5 parts of the polymer power which was synthesized according to the method described in Example 1 were dissolved in 95 parts of water to make an aqueous solution. A quantity of 3 parts of 37% aqueous solution of formaldehyde was added to it and methylolation was carried out at 60° C. for 60 minutes under the condition of pH 9 which was regulated by means of adding 5% aqueous sodium carbonate solution.

By adding 300 parts of methyl alcohol, a chromogen-bonded-polymer was obtained. This polymer was dried in an open air to obtain polymer powder. The polymer powder was quite soluble in water and a clear aqueous solution was obtained.

EXAMPLE 3

A quantity of 3 parts of unmethylolated chromogen-bonded-polymer synthesized according to the method described in Example 1 was dissolved in 97 parts of water to make an aqueous solution. A quantity of 0.5 part of melamine and 5.4 parts of 37% aqueous solution of formaldehyde was added to the solution. The pH of the solution was regulated at 7.5 by the addition of 5% aqueous sodium carbonate solution thereto. Clear solution was obtained by then heating at 70° C. for 10 minutes.

After cooling the solution down to 45° C., 0.2 part of sulfamic acid and 2.0 parts of 30% aqueous hydrochloric acid solution were added together to the above solution, and then by lowering the pH of the solution to 4.5, condensation occurred. After about 10 minutes, by taking a drop of reactant solution, the condensation degree was detected by dropping it into a large quantity of cold water and checking the point where a resinous precipitate would be formed.

Then 0.8 part of 20% aqueous sodium hydroxide solution were added to the solution which made the pH of the reactant about 10, at which point chromogen-bonded-polymer solution was obtained. At this state of precipitation, nothing could be found when one drop of reactant was dropped into a large amount of cool water.

To a chromogen-bonded-polymer solution which was synthesized according to the method described in this example, 3 times its volume of methanol was added, whereby chromogen-bonded-polymer precipitate was obtained. This polymer precipitate was dissolved in water to dilute it to 5% by weight in aqueous solution.

According to the following composition, emulsion-polymerization was carried out at 55° C. for 1 hour, 65° C. for 4 hours, and 80° C. for 2 hours, with a continuous agitation and heating, and thus colored latex was obtained.

| | Parts |
|---|---|
| Chromogen-bonded-polymer solution mentioned above | 75.0 |
| Butyl acrylate | 9.5 |
| Vinyl acetate | 1.5 |
| Vinylidene chloride | 9.0 |
| Acrylamide | 0.2 |
| Sodium phosphate | 0.5 |
| Sodium alkyl benzene sulfonate | 0.5 |
| Potassium persulfate | 0.04 |
| Water | 3.76 |
| Total | 100.00 |

Similar colored latex was also obtained using the chromogen-bonded-polymer solution which was synthesized according to Example 2 instead of this example.

This example shows the production of a chromogen-bonded-polymer which is both methylolated to be reactive and has introduced thereinto a water solubilizable sulfo radical by the use of sulfamic acid. In addition, it illustrates the production of a colored latex comprising mixing a reactive solubilizable chromogen-bonded-polymer with addition-polymerizable monomers and polymerization initiator, and polymerizing these monomers in aqueous solution of the chromogen-bonded-polymer.

EXAMPLE 4

5 parts of unmethylolated chromogen-bonded-polymer which was synthesized according to the method described in the method of Example 1 were dissolved in 95 parts of water to give a chromogen-bonded-polymer aqueous solution. 10 parts of melamine and 43 parts of 37% aqueous solution of formaldehyde were added to the colored solution. Methylolation reaction was carried out at 70° C. after the pH of the reactant was regulated with 5% aqueous sodium carbonate solution to 7.5. After the complete dissolution was achieved by the addition of 50 parts of butanol and 1 part of phosphoric acid, a dehydration reaction was carried out at 90° C. by circulating the butanol and water, which was stripped off and collected from the reactant. After the reaction was completed, by taking off the excess butanol under reduced pressure, and by concentrating the reactant to a viscous solution containing 50% of solid content, butyl-methylol-melamine type resinous solution was obtained.

EXAMPLE 5

Diaminophthaloperinone orange was diazotized in the aqueous medium containing hydrochloric acid in a concentration equal to 14 times the molar concentration of the amino radicals, and stabilized using zinc chloride according to the method described in Example 1.

A mixture was then formulated as follows:

| | Parts |
|---|---|
| A 15% paste containing thus-obtained stabilized diazonium salt | 30 |
| Acrylamide | 6 |
| Itaconamide | 2 |
| Water | 62 |
| Total | 100 |

The polymerization was carried out according to the method described in Example 1.

After polymerization, 400 parts of methyl alcohol and 5 parts of sodium chloride were added to the above-obtained solution to precipitate the chromogen-bonded-polymer. Thereafter, 5 parts of the precipitated polymer were dissolved in water to make up the solution to 100 parts and 10 parts of 37% aqueous solution of formaldehyde were added thereto. Methylolation was then carried out at 65° C. for 25 minutes under the condition of pH 9 which was regulated by the addition of 5% aqueous sodium carbonate solution and the reaction solution was filtered.

After filtration, 500 parts of methyl alcohol and 5 parts of sodium chloride were added to the filtrate. The chromogen-bonded-polymer was obtained by filtering, washing with 10 parts of methyl alcohol and drying in open air.

EXAMPLE 6

2.4 - bis-[4-aminoanthraquinonyl - (1) - amino]-6-(p-aminophenoxy)-s-triazine was diazotized and stabilized using zinc chloride according to the method described in Example 1.

A mixture was then formulated as follows:

| | Parts |
|---|---|
| A 15% paste containing thus-obtained stabilized diazonium salt | 30 |
| N-methylmethylolacrylamide | 8 |
| Water | 62 |
| Total | 100 |

The polymerization was carried out according to the method described in Example 1.

After polymerization, 300 parts of methyl alcohol were added to the solution to precipitate the chromogen-bonded-polymer.

The chromogen-bonded-polymer powder was obtained by filtering, washing with 20 parts of methyl alcohol and drying in open air.

EXAMPLE 7

Diaminoperylene vermilion was diazotized and stabilized using zinc chloride according to the method described in Example 1.

A mixture was then formulated as follows:

| | Parts |
|---|---|
| A 15% paste containing the thus-obtained stabilized diazonium salt | 30 |
| Acrylamide | 6 |
| Methyl acrylate | 1 |
| Glycidyl methacrylate | 1 |
| Water | 62 |
| Total | 100 |

The polymerization was carried out according to the method described in Example 1.

After polymerization, 200 parts of methyl alcohol were added to precipitate the chromogen-bonded-polymer.

The chromogen-bonded-polymer powder was obtained by filtering, washing with 20 parts of methyl alcohol and drying in open air.

EXAMPLE 8

The amino derivative of the azo pigment of the following formula was diazotized using 35% hydrochloric acid solution in an amount equal to 12 times the molar amount of the amino radicals and stabilized using zinc chloride according to the method described in Example 1.

A mixture was then formulated as follows:

| | Parts |
|---|---|
| A 15% paste containing thus-obtained stabilized diazonium salt | 20 |
| Glycidyl methacrylate | 6 |
| Sodium alkylbenzenesulfonate | 0.5 |
| Water | 73.5 |
| Total | 100 |

The polymerization was carried out according to the method described in Example 1.

After polymerization, the precipitated chromogen-bonded-polymer was filtered and washed with 100 parts of water and 50 parts of methyl alcohol. The chromogen-bonded-polymer was obtained.

EXAMPLE 9

The amino derivative of azo pigment of the following formula was diazotized and stabilized using triethanolamine dodecylbenzenesulfonate instead of zinc chloride according to the method described in Example 8.

A mixture was then formulated as follows:

| | Parts |
|---|---|
| A 15% paste containing the thus-obtained stabilized diazonium salt | 20 |
| Propylmethacrylate | 9 |
| Glycidyl methacrylate | 1 |
| N.N'-dimethylformamide | 70 |
| Total | 100 |

When this solution was kept at 50° C. for 20 minutes, and then heated at 65° C. for 60 minutes, polymerization occurred with the evolution of foams.

After polymerization, this solution was poured into 5,000 parts of water with strong agitation to precipitate the chromogen-bonded-polymer.

After filtration, the chromogen-bonded-polymer was obtained.

EXAMPLE 10

2.4.6-tris - [4 - amino-anthraquinonyl - (1) - amino]-s-triazine was diazotized and stabilized using laurylsulfuric acid instead of zinc chloride according to the method described in Example 1.

A mixture was then formulated as follows:

| | Parts |
|---|---|
| A 15% paste containing the thus-obtained stabilized diazonium salt | 30 |
| Methyl methacrylate | 5 |
| Ethyl acrylate | 2 |
| Glycidylmethacrylate | 1 |
| Water | 62 |
| Total | 100 |

The polymerization was carried out according to the method described in Example 1.

After polymerization, 200 parts of methyl alcohol were added to precipitate the chromogen-bonded-polymer. After filtering, washing with 50 parts of water and 20 parts of methyl alcohol, and drying in open air, the chromogen-bonded-polymer powder was obtained.

EXAMPLE 11

25 parts of glycerine were reacted together with 190 parts of linseed oil in a reaction vessel at 180° C. for 2 hours under the circulation of nitrogen gas. 0.2 parts of zinc acetate and 10 parts of polymer powder synthesized according to the method of Example 10 were added in the form of 60% xylene solution to the above reaction mixture.

Elevating the temperature to 140° C., gradually, and stripping off the mixed vapour of alcohol and xylene, reaction was carried out. The reaction was then carried out for 30 minutes at 200° C. and thereafter was continued for 4 hours at 230 to 250° C. with the addition of 60 parts of phthalic acid. A viscous, alkyd type solution was obtained.

This example illustrates the formation of a viscous alkyd type chromogen-bonded-polymer having weak reactive radicals, which are stable at room temperature and react with each other at high temperature, i.e., carboxyl and hydroxyl radicals, and hydrophobic radicals, i.e., aryl and aliphatic hydrocarbon radicals.

EXAMPLE 12

Triamino flavanthrone yellow was diazotized and stabilized using disodium naphthalene-1.5-disulfonate instead of zinc chloride according to the method described in Example 1.

A mixture was then formulated as follows:

| | Parts |
|---|---|
| A 15% paste containing the thus-obtained stabilized diazonium salt | 20 |
| Dilaurylitaconate | 6 |
| Octyl acrylate | 1 |
| 4,6-bis(N-butylmethylolamino)-2-vinyl-S-triazine | 72.5 |
| Water | 72.5 |
| Total | 100.0 |

The polymerization was carried out according to the method described in Example 1.

After polymerization, the precipitated chromogen-bonded-polymer was filtered and washed with 100 parts of water and 50 parts of methyl alcohol. The chromogen-bonded-polymer was obtained.

EXAMPLE 13

Diamino disulfonated phthaloperinone was diazotized utilizing a quantity of 35% hydrochloric acid solution equal to 13 times the molar concentration of the amino radicals and stabilized using zinc chloride according to the method described in Example 1.

A mixture was then formulated as follows:

| | Parts |
|---|---|
| A 15% paste containing the thus-obtained stabilized diazonium salt | 20 |
| N-sulfonylethylene acrylamide | 2 |
| Sulfomethylolacrylamide | 4 |
| Water | 74 |
| Total | 100 |

The polymerization was carried out according to the method described in Example 1.

After polymerization, 200 parts of methyl alcohol and 5 parts of sodium chloride were added to precipitate the chromogen-bonded-polymer.

After filtration, the chromogen-bonded-polymer was washed with 50 parts of methyl alcohol and dried in open air to obtain the chromogen-bonded-polymer powder.

EXAMPLE 14

Diaminoindigo was diazotized and stabilized using dodecylbenzenesulfonic acid instead of zinc chloride according to the method described in Example 1.

A mixture was then formulated as follows:

| | Parts |
|---|---|
| A 15% paste containing the thus-obtained stabilized diazonium salt | 30 |
| Propenyl phenyl urethane | 2 |
| Propyleneglycolmonoacrylate | 8 |
| Water | 60 |
| Total | 100 |

The polymerization was carried out according to the method described in Example 1.

After polymerization, 200 parts of methyl alcohol were added to precipitate the chromogen-bonded-polymer. After filtering, the chromogen-bonded-polymer was obtained.

EXAMPLE 15

Triamino-carbazole dioxazine violet was diazotized and stabilized using zinc chloride according to the method described in Example 1.

A mixture was then formulated as follows:

| | Parts |
|---|---|
| A 15% paste containing the thus-obtained stabilized diazonium salt | 25 |
| Acrylic acid | 5 |
| Water | 70 |
| Total | 100 |

The polymerization was carried out according to the method described in Example 1.

After polymerization, 500 parts of acetone and 4 parts of sodium chloride were added to precipitate the chromogen-bonded-polymer.

After filtration, the chromogen-bonded-polymer was washed with 10 parts of acetone, and dried in open air.

EXAMPLE 16

Diaminoquinacridone was diazotized and stabilized using triethanolamine dodecylbenzenesulfonate instead of zinc chloride according to the method described in Example 1.

A mixture was then formulated as follows:

| | Parts |
|---|---|
| A 15% paste containing the thus-obtained stabilized diazonium salt | 20 |
| Methacrylic acid | 1 |
| Ethyleneglycolmonoacrylate | 3 |
| Trichloroethylene | 53 |
| Isopropyl alcohol | 23 |
| Total | 100 |

The polymerization was carried out according to the method described in Example 9.

After polymerization, the precipitated chromogen-bonded-polymer was filtered and dried in open air to obtain the chromogen-bonded-polymer powder.

EXAMPLE 17

Triamino vat orange GR was diazotized using 35% hydrochloric acid in a quantity equal to 16 times the molar amount of the amino radicals and stabilized using N-methyltaurine instead of zinc chloride according to the method described in Example 1.

A mixture was then formulated as follows:

| | Parts |
|---|---|
| A 15% paste containing the thus-obtained stabilized diazo compound | 20 |
| Acrylic acid | 4 |
| Methyl acrylate | 1 |
| Water | 75 |
| Total | 100 |

The polymerization was carried out according to the method described in Example 1.

After polymerization, 300 parts of methyl alcohol were added to precipitate the chromogen-bonded polymer. After filtration, the chromogen-bonded-polymer was washed with 50 parts of methyl alcohol and dried in open air to obtain the chromogen-bonded-polymer powder.

EXAMPLE 18

Triamino isoviolanthrone was diazotized and stabilized using triethanolamine alkylbenzenesulfonate instead of zinc chloride according to the method described in Example 1.

A mixture was then formulated as follows:

| | Parts |
|---|---|
| A 15% paste containing the thus-obtained stabilized diazonium salt | 30 |
| Methyl methacrylate | 10 |
| Water | 60 |
| Total | 100 |

The polymerization was carried out according to the method described in Example 1.

After polymerization, the precipitated chromogen-bonded-polymer was filtered and washed with 100 parts of water and 50 parts of methyl alcohol. 5 parts of the obtained chromogen-bonded-polymer were dissolved in 95 parts of acetone and filtered. 400 parts of methyl alcohol were added to the filtrate with strong agitation to precipitate the chromogen-bonded-polymer.

After filtration, the chromogen-bonded-polymer was dried in open air to obtain the chromogen-bonded-polymer.

EXAMPLE 19

Diaminophethaloperinone red was diazotized and stabilized using sarcosine instead of N-methyl taurine according to the method described in Example 17.

A mixture was then formulated as follows:

| | Parts |
|---|---|
| A 15% paste containing the thus-obtained stabilized diazo compound | 30 |
| Butyl acrylate | 8 |
| Acrylonitrile | 1 |
| Water | 61 |
| Total | 100 |

The polymerization was carried out according to the method described in Example 1.

After polymerization, the precipitated chromogen-bonded-polymer was filtered and washed with 100 parts of water and 50 parts of methyl alcohol. Thereafter, the chromogen-bonded-polymer was dried in open air to obtain the chromogen-bonded-polymer powder.

EXAMPLE 20

Diamino disulfonated flavanthrone was diazotized and stabilized using 1-methylimino-5-sulfobenzoic acid instead of zinc chloride according to the method described in Example 1.

A mixture was then formulated as follows:

| | Parts |
|---|---|
| A 15% paste containing the thus-obtained stabilized diazo compound | 20 |
| Itaconic acid | 2 |
| Polyethyleneglycolmonoacrylate | 3 |
| Water | 75 |
| Total | 100 |

The polymerization was carried out according to the method described in Example 1.

After polymerization, 500 parts of methyl alcohol were added to precipitate the chromogen-bonded-polymer. After filtration, the chromogen-bonded-polymer was washed with 50 parts of methyl alcohol and dried in open air.

EXAMPLE 21

2.4.6 - tris - [4-(aminobenzamido)anthraquinonyl-(1)-amino]-s-triazine was diazotized and stabilized using triethanolamine dodecylbenzene sulfonate instead of zinc chloride according to the method described in Example 1.

A mixture was then formulated as follows:

| | Parts |
|---|---|
| A 15% paste containing the thus-obtained stabilized diazonium salt | 20 |
| Acrylonitrile | 6 |
| Sodium dodecylbenzenesulfonate | 0.5 |
| Water | 73.5 |
| Total | 100.0 |

The polymerization was carried out according to the method described in Example 1.

After polymerization, the precipitated chromogen-bonded-polymer was filtered and washed with 100 parts of water and 50 parts of methyl alcohol. Thereafter, the chromogen-bonded-polymer was dried in open air to obtain its powder.

EXAMPLE 22

Oil black was diazotized and stabilized using zinc chloride according to the method described in Example 1.

A mixture was then formulated as follows:

| | Parts |
|---|---|
| A 15% paste containing the thus-obtained stabilized diazonium salt | 30 |
| Methyl methacrylate | 6 |
| Sodium lauryl sulfate | 0.5 |
| Water | 63.5 |
| Total | 100.0 |

The polymerization was carried out according to the method described in Example 1.

After polymerization, the precipitated chromogen-bonded-polymer was filtered and washed with 100 parts of water and 50 parts of methyl alcohol. Thereafter, the chromogen-bonded-polymer was dried in open air to obtain its powder.

EXAMPLE 23

A quantity of 5 parts of indanthlene yellow 4GF was added to 100 parts of 85% sulfuric acid and dissolved therein. 3.4 parts of hydroxylamide sulfate and 1 part of ferrous sulfate were added to the solution, which was kept at 45° C. for 5 hours for reaction. After being permitted to stand to cool, the reaction mixture was poured into 300 parts of water with ice and the reaction product was obtained, washed with water and dried to provide 5.5 parts of the chromogen-containing amino compound.

A quantity of 5 parts of the chromogen-containing amino compound obtained according to the above procedure was added to 100 parts of 35% hydrochloric acid solution, and the resulting mixture was heated to 30 to 40° C. to dissolve the aforesaid chromogen-containing amino compound. Thereafter, the solution was cooled with ice to 5° C. and below.

Thereafter, a solution of 1 part of sodium nitrite in 10 parts of water was added to the above solution, and diazotization of the amino compound was carried out for 30 minutes at 0 to 5° C.

A quantity of 100 parts of water and ice was added to the above mixture, and the thus-obtained mixture was then filtered. To the resulting filtrate, there was added an emulsion consisting of 40 parts of methylmethacrylate, 100 parts of water and 8 parts of triethanolamine dodecylbenzene sulfonate. This mixture was polymerized for 4 hours at 50 to 60° C. Thereafter, after being cooled, the polymer was filtered, washed with water and dried. The polymer was then dissolved in 200 parts of acetone, and the polymer solution was poured into water, whereby 19.4 parts of the chromogen-bonded-polymer was obtained.

EXAMPLE 24

A quantity of 6 parts of indanthrene scarlet BL was put into a four-mouth flask, 120 parts of nitrobenzene were added thereto and the resulting mixture was stirred for 20 minutes. When the temperature of the mixture reached 20° C., 6.3 parts of fuming nitric acid ($d=1.52$) were dropped into the mixture over a period of 20 minutes. The mixture was then heated to 80° C., at which point reaction was carried out for 6 hours.

The reaction product was cooled to 20 to 25° C., and was educed by adding methanol thereto. The precipitate was filtered, washed with methanol and water and dried, and nitro compound was obtained thereafter. 5 parts of the nitro compound were suspended in 80 parts of water, 20 parts of 35% hydrochloric acid solution were added to the suspension and stannous chloride was gradually added thereto with stirring. The mixture was then heated and reduced for 5 hours at 70 to 80° C., at which juncture 300 parts of 10% hydrochloric acid were added thereto. The resulting precipitate was filtered out, washed with water and dried to produce 4.6 parts of the chromogen-containing amino compound.

A quantity of 3 parts of the chromogen-containing amino compound was suspended in 50 parts of 35% hydrochloric acid solution, the solution was cooled to 0° C. and at this 0° C. temperature, a solution of 1.2 parts of sodium nitrite in 10 parts of water was added for diazotization for 30 minutes at 0 to 2° C. 30 parts of water with ice were added to the diazotized solution, and the mixture was filtered. Thereafter, there was added an emulsion comprising 20 parts of methylmethacrylate, 50 parts of water and 6 parts of triethanolamine dodecylbenzene sulfonate to the filtrate and the thus-obtained mixture was stirred for 3 hours at 60 to 70° C. to effect polymerization. After polymerization, the polymer was filtered, washed with water and dried. Then the polymer was dissolved in acetone, and the solution was filtered, the resulting filtrate again being poured into water. The precipitate was washed with water and filtered.

EXAMPLE 25

A quantity of 1.5 parts of amino derivative of azo pigment of the following formula

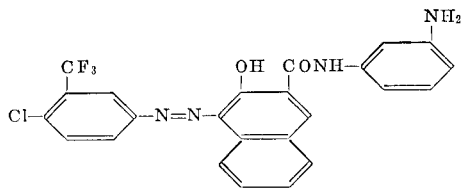

was suspended in 25 parts of acetic acid. To this suspension, 3 parts of 35% hydrochloric acid solution were added, and the resulting mixture was cooled to 0° C. To the cooled mixture there was added a solution of 0.5 part of sodium nitrite in 3 parts of water, and the mixture was diazotized at 0 to 2° C. After the filtering of the diazotized solution, 1 part of zinc chloride was added to the filtrate. The obtained stabilized diazonium salt was salted out and was dissolved in 30 parts of water. To the latter solution there was added a solution of 5 parts of acrylamide in 25 parts of water, and the resulting mixture was polymerized for 1 hour at 70° C. The polymer was then filtered, the paste thereof was suspended in 50 parts of water, and 5.5 parts of 37% formalin were added to the suspension, the pH of which was further adjusted to 8 to 9 with 5% sodium carbonate solution. Thereafter, methylolation was carried out for 30 minutes at 50 to 60° C. Methanol was then added to the uniform methylolation reaction solution, and the resulting precipitate was filtered, washed with ether and dried in open air. A quantity of 2.5 parts of the chromogen-bonded-polymer was obtained.

EXAMPLE 26

A quantity of 2.5 parts of the amino derivative of the azo pigment described in Example 25 was diazotized after being mixed with 0.8 part of sodium nitrite. To the filtrate of the diazotization reaction solution there was added 0.8 part of zinc chloride, and the obtained stabilized diazonium salt, after being salted out, was added to 50 parts of water. Thereafter, an emulsion consisting of 7.5 parts of methylmethacrylate, 20 parts of water and 0.5 part of an anionic surface active agent was added to the above mixture, and the resulting mixture was polymerized for 1.5 hours at 60 to 70° C. After polymerization, the polymer was filtered, washed with water and further dissolved in 40 parts of acetone. After filtering the acetone solution, the filtrate was poured into water for precipitation. The resulting precipitate was filtered and dried to obtain 6 parts of the chromogen-bonded-polymer.

EXAMPLE 27

A quantity of 2.9 parts of the amino derivative of the azo pigment of the following formula

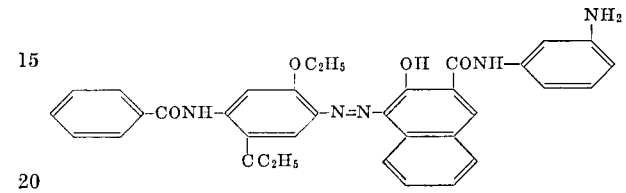

was diazotized in 100 parts of water-acetone mixed solvent containing 2.2 parts of 35% hydrochloric acid solution, 0.4 part of sodium nitrite and 2 parts of zinc chloride. After salting out and filtration, the obtained stabilized diazonium salt and 12 parts of acrylamide were added to 200 parts of water. The resulting solution was heated to 70° C. and maintained thereat for 2 hours to polymerize the monomer.

After polymerization, the solution was poured into 600 parts of methylalcohol and the resulting precipitate was filtered. After washing the precipitate, the obtained chromogen-bonded-polymer and 5 parts of 37% formalin were added to 200 parts of water. The methylolation reaction was carried out for 60 minutes at 70° C. Then, the obtained solution was filtered and poured into 600 parts of methyl alcohol. The chromogen-bonded-polymer was obtained by drying the methyl alcohol solution precipitate in open air after treating it with ether.

EXAMPLE 28

The amino derivative of the azo pigment of the following formula

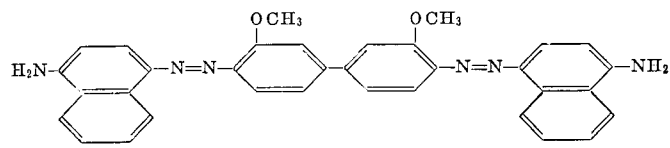

was diazotized and stabilized using zinc chloride according to the method described in Example 8.

A mixture was then formulated as follows:

| | Parts |
|---|---|
| A 15% paste containing the thus-obtained stabilized diazonium salt | 20 |
| Acrylamide | 6 |
| Methylacrylate | 1 |
| Water | 123 |
| Total | 150 |

The polymerization was carried out according to the method described in Example 1. After polymerization, the obtained solution was filtered and the filtrate was poured into 400 parts of methyl alcohol and the resulting precipitate was filtered. The precipitate was methylolated using 4 parts of 37% formalin according to the method described in Example 2.

After methylolation, the obtained solution was poured into 400 parts of methyl alcohol. The precipitate was filtered, treated with ether and dried in open air to obtain the chromogen-bonded-polymer.

EXAMPLE 29

A quantity of 3.8 parts of the amino derivative of the azo dye of the following formula

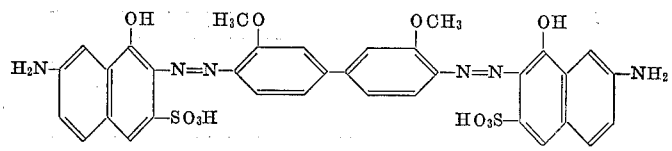

was suspended in 100 parts of water. 14 parts of 35% hydrochloric acid solution were added thereto with stirring over a period of 30 minutes at 30° C., and then the suspension was cooled to 0° C.

A solution of 1.0 part of sodium nitrite in 20 parts of water was added dropwisely to the cooled suspension over a period of 15 minutes, and the resulting mixture was diazotized for 30 minutes. This diazotization solution mixture was filtered, and 2 parts of zinc chloride were added to the filtrate. Salting out and filtration were carried out to obtain the stabilized diazonium salt. The thus-obtained stabilized diazonium salt was dissolved in 100 parts of water, and to such solution there were further added 100 parts of water with ice and 12 parts of acrylamide. The resulting mixture was heated to undergo polymerization for 1 hour at 70 to 80° C. Thereafter, the obtained solution was poured into methanol to precipitate the polymer, and the precipitate was filtered out and washed. Then, the filtered paste was dispersed in 200 parts of water, and to the dispersion, 5 parts of formalin were added. The dispersion was methylolated for 30 minutes at 50 to 60° C. to obtain a uniformly purple solution, which was poured into methanol and the precipitate was filtered. The precipitate was dried in open air after treating it with ether to obtain 9.8 parts of the chromogen-bonded-polymer.

EXAMPLE 30

An emulsion comprising 11.4 parts of methylmethacrylate, 30 parts of water and 5.5 parts of triethanolamine dodecylbenzene sulfonate were added to the filtrate of the diazonium salt obtained from the method of Example 29 using 3.8 parts of the amino azo dye of the same example, and the resulting mixture was stirred for 3 hours at 60 to 70° C. to effect polymerization. Thereafter the thus obtained polymer was filtered out, washed with water and methanol and dried, it was dissolved in 80 parts of acetone and filtered, and the filtrate was poured into water. After the filtration and the drying of the precipitate, 8.2 parts of the chromogen-bonded-polymer were obtained.

EXAMPLE 31

A quantity of 1.0 part of diamino copper phthalocyanine blue hydrochloride was diazotized using 20 parts of 35% hydrochloric acid solution and 0.3 part of sodium nitrite and stabilized using 0.3 part of zinc chloride according to the method described in Example 1.

A mixture was then formulated as follows:

| | Parts |
|---|---|
| A 15% paste containing the thus-obtained stabilized diazonium salt | 7 |
| Methyl methacrylate | 6 |
| Polyethyleneglycol alkyl ether | 0.5 |
| Water | 115 |
| Total | 128.5 |

The polymerization was carried out for 1 hr. at 60° C. After polymerization, the precipitate was filtered, washed with 300 parts of water and 50 parts of methyl alcohol and dried in open air to obtain the chromogen-bonded-polymer.

EXAMPLE 32

A quantity of 2.2 parts of tri-sulfonated monoamino cobalt phthalocyanine blue hydrochloride was diazotized using 0.2 part of sodium nitrite and 5 parts of 35% hydrochloric acid solution and stabilized using 0.2 part of zinc chloride according to the method described in Example 1.

A mixture was then formulated as follows:

| | Parts |
|---|---|
| A 15% paste containing the thus-obtained stabilized diazonium salt | 15 |
| Acrylamide | 8 |
| Water | 77 |
| Total | 100 |

The polymerization was carried out according to the method described in Example 1. After polymerization, 300 parts of methyl alcohol and 2 parts of sodium chloride were added to the above obtained solution to precipitate the chromogen-bonded-polymer. After filtration, the chromogen-bonded-polymer was obtained by washing with 10 parts of methyl alcohol and drying in open air.

EXAMPLE 33

A quantity of 1.5 parts of tetraamino nickel phthalocyanine hydrochloride were diazotized using 0.6 part of sodium nitrite and 8 parts of 35% hydrochloric acid solution and stabilized using 0.6 part of zinc chloride according to the method described in Example 1.

A mixture was then formulated as follows:

| | Parts |
|---|---|
| A 15% paste containing the thus-obtained stabilized diazonium salt | 9 |
| Butyl acrylate | 3.5 |
| Polyethyleneglycol alkyl ether | 0.5 |
| Water | 87 |
| Total | 100 |

The polymerization was carried out according to the method described in Example 1. After polymerization, the chromogen-bonded-polymer was filtered, washed with 300 parts of water and 100 parts of methol alcohol. The chromogen-bonded-polymer was dissolved in acetone to obtain a 10% acetone solution of the chromogen-bonded-polymer. After filtration, such solution was poured into water to precipitate the chromogen-bonded polymer. Then, the chromogen-bonded-polymer was filtered and dried.

EXAMPLE 34

A quantity of 7.5 parts of amino derivative of the azo pigment of the following formula:

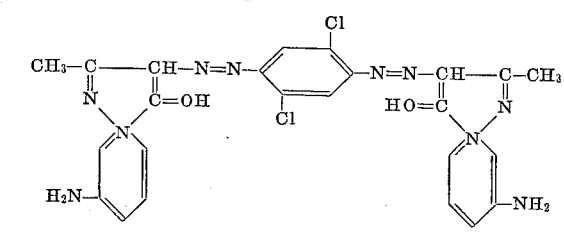

were suspended in 200 parts of water with 27 parts of 35% hydrochloric acid solution, and diazotized using 1.8 parts of sodium nitrite and stabilized using 3.6 parts of zinc chloride according to the method described in Example 1 to obtain the stabilized diazonium salt.

The thus-obtained stabilized diazonium salt was dissolved in 200 parts of water, and 15 parts of acrylamide were added to the solution. The resulting mixture was heated to effect polymerization for 2 hrs. at 70° to 80° C. Thereafter, the obtained solution was poured into 600 parts of methyl alcohol to precipitate the chromogen-bonded-polymer and such precipitate was filtered and washed with methyl alcohol. Then, the filtered paste and 8.9 parts of 37% formaldehyde aqueous solution were added to 200 parts of water. Methylolation was carried out for 1 hr. at 60° C. under the condition of pH 9 to 10 which was regulated by adding 5% sodium carbonate aqueous solution. The solution was poured into 600 parts of methyl alcohol and the resulting precipitate was filtered and dried in open air to obtain the chromogen-bonded-polymer.

EXAMPLE 35

Indanthrene Green BB was diazotized and stabilized using stannic chloride instead of triethanolamide dodecylbenzenesulfonate according to the method described in Example 23. The paste of the stabilized diazonium salt was washed with 3 times it's quantity of acetone, and dried in open air.

A mixture was then formulated as follows:

| | Parts |
|---|---|
| The thus-obtained powder of the stabilized diazonium salt | 4 |
| Aminostyrene acetic acid salt | 4 |
| Ethyleneglycolmonomethacrylate | 4 |
| Water | 88 |
| Total | 100 |

The polymerization was carried out at 60° C. for 2 hrs. and at 75° C. for 1 hr. After polymerization, 500 parts of methyl alcohol were added to precipitate the chromogen-bonded-polymer. The precipitate was filtered and washed with 20 parts of methyl alcohol.

A quantity of 5 parts of the obtained chromogen-bonded-polymer was dissolved in 45 parts of water with vigorous stirring. To this solution maintained under low pressure, ethylene oxide was introduced with pressure and reacted with the amino radicals of the chromogen-bonded-polymer in a ratio of about 20 moles of ethylene oxide per amino radical of the chromogen-bonded-polymer.

EXAMPLE 36

Indanthrene Rubine GR was diazotized according to the method described in Example 23 and stabilized using fluoroboric acid instead of zinc chloride according to the method described in Example 1.

A mixture was then formulated as follows:

| | Parts |
|---|---|
| A 25% paste containing the above-obtained stabilized diazonium salt | 30 |
| N-vinyl pyrrolidone | 9 |
| 2-vinyl-5-methyl pyridinium acetate | 1 |
| Water | 60 |
| Total | 100 |

The polymerization was carried out according to the method described in Example 1. After filtration of the polymerization solution, a clear solution of the chromogen-bonded-polymer was obtained.

EXAMPLE 37

2,4,6-tris[4-(aminobenzamido) - anthraquinonyl - (1)-amino]-s-triazine was diazotized and stabilized using triethanolamine dodecylbenzene sulfonate according to the method described in Example 21. The resulting paste was washed with acetone and dried in open air.

A mixture was then formulated as follows:

| | Parts |
|---|---|
| The thus-obtained stabilized diazonium salt powder | 4 |
| Butylacrylate | 6 |
| Styrene | 1 |
| Maleic anhydride | 2 |
| Trichloroethylene | 37 |
| Ethyleneglycolmonoethylether monoacetate | 50 |
| Total | 100 |

The polymerization was carred out according to the method described in Example 35.

After polymerization, 3 parts of diethylenetriamine were added to the solution and reacted at 70° C. for 3 hrs. Then, the solution was poured into 400 parts of methyl alcohol containing 5 parts of 20% of aqueous solution of sodium chloride to precipitate the aminated chromogen-bonded-polymer. The precipitate was filtered, washed with 50 parts of methyl alcohol and dried in open air.

This chromogen-bonded-polymer was easily dissolved in aqueous acidic solution containing an acid such as acetic acid, tartaric acid or hydrochloric acid.

EXAMPLE 38

2,4,6 - tris[3 - chloro - amino - anthraquinonyl - (2)-amino]-s-triazine was diazotized and stabilized using stannic chloride instead of zinc chloride according to the method described in Example 1.

A mixture was then formulated as follows:

| | Parts |
|---|---|
| A 20% paste containing the thus-obtained stabilized diazonium salt | 20 |
| Monomethylitaconatemonoacid | 3 |
| Methacrylamide | 3 |
| Water | 74 |
| Total | 100 |

The polymerization was carried out according to the method described in Example 1.

After polymerization, 1 part of sodium chloride and 200 parts of acetone were added to precipitate the chromogen-bonded-polymer. The precipitate was filtered, washed with 30 parts of acetone and dried in open air.

EXAMPLE 39

2,4,6 - tris[4 - aminoanthraquinonyl - (1) - amino]-s-triazine was diazotized according to the method described in Example 1 and stabilized using fluoroboric acid according to the method described in Example 36.

A mixture was then formulated as follows:

| | Parts |
|---|---|
| A 15% paste containing the thus-obtained stabilized diazonium salt | 20 |
| Diethylitaconate | 4 |
| Vinylidene chloride | 3 |
| Vinyl acetate | 2 |
| Methacrylamide | 0.5 |
| β-hydroxy-γ-chloro-n-propylacrylate | 0.5 |
| Polyethyleneglycolalkylaryether | 0.3 |
| Water | 69.7 |
| Total | 100 |

An emulsion polymerization was carried out at 60° C. for 1 hr., at 70° C. for 2 hrs., and at 80° C. for 30 minutes.

After polymerization, the obtained latex of the chromogen-bonded-polymer was filtered with a coarse filter cloth.

EXAMPLE 40

The reduced product of Indanthrene Black BB was diazotized and stabilized using fluoroboric acid instead of zinc chloride according to the method described in Example 1.

A mixture was then formulated as follows:

| | Parts |
|---|---|
| A 25% paste containing the thus-obtained stabilized diazonium salt | 20 |
| Lauryl itaconate monoamide | 3 |
| Methacrylamide | 3 |
| Sodium alkylarylsulfonate | 0.1 |
| Water | 73.9 |
| Total | 100 |

The polymerization was carried out according to the method described in Example 1.

After polymerization, 400 parts of methyl alcohol were added to precipitate the chromogen-bonded-polymer. The precipitate was filtered, washed with 10 parts of acetone and dried in open air.

Thereafter, 5 parts of the above obtained chromogen-bonded-polymer and 0.7 parts of paraformaldehyde were added to 95 parts of a pyridine solution containing 2.7 parts of pyridine hydrochloric acid salt and reacted at 80° C. for 10 hrs. After this reacting, the pyridine of the solvent was almost completely distilled off at 60° to 70° C. under reduced pressure. Thereafter, to precipitate the chromogen-bonded-polymer, 3 times it's quantity of acetone were added to the remaining solution. The precipitate was filtered to obtain the chromogen-bonded-polymer.

EXAMPLE 41

Pentaamino copper phthalocyanine black, prepared by introducing amino radicals by post-amination using hydroxylamine and ammonium molybdate as a catalyst in sulfuric acid medium into a black pigment prepared by oxidizing amino copper phthalocyanine blue, was diazotized and stabilized using fluoroboric acid instead of zinc chloride according to the method described in Example 1.

A mixture was then formulated as follows:

| | Parts |
|---|---|
| A 25% paste containing the thus-obtained stabilized diazonium salt | 20 |
| N,N'-dimethylol itaconic diamide | 5 |
| Ethyleneglycolmonomethacrylate | 2 |
| Water | 73 |
| Total | 100 |

The polymerization was carried out under mild conditions pH according to the method described in Example 1.

After polymerization, 60 parts of 10% aqueous solution of sodium bisulfite were added to the obtained solution and a sulfonation reaction was carried out at 60° C. for 30 minues. After filtration, 2 parts of sodium chloride and 500 parts of methyl alcohol were added to the filtrate to precipitate the chromogen-bonded-polymer. The precipitate was filtered, washed with 10 parts of acetone and dried in open air.

EXAMPLE 42

The following components were mixed together:

| | Parts |
|---|---|
| 5% solution of chromogen-bonded-polymer which was obtained according to the method described in the first step of Example 3 | 35.0 |
| Polyethylene glycol alkyl ether | 1.0 |
| Mineral turpene | 64.0 |
| Total | 100.0 |

The mixture thus obtained was vigorously stirred in a homogenizing mixer to prepare an oil-in-water type of emulsion for use as a textile printing paste. This emulsion was printed on a cloth by a gravure-type printing machine, dried on a steam cylinder and heated at 130° C. for 5 minutes in air to obtain a clear printed cloth having high resistance against abrasion, washing and organic solvents.

EXAMPLE 43

In a reaction vessel, a latex of approximatetly 28% resin content was prepared in accordance with the following formulation by an emulsion polymerization.

| | Parts |
|---|---|
| N-methylolacrylamide | 2.0 |
| Butyl acrylate | 13.0 |
| Vinylidene chloride | 13.0 |
| Sodium hydroxide | 0.2 |
| Potassium dihydrogen phosphate | 0.8 |
| Sodium alkylarylsulfonate | 0.95 |
| Sodium persulfate | 0.05 |
| Water | 70.00 |
| Total | 100.00 |

The following components were then mixed together:

| | Parts |
|---|---|
| 5% solution of chromogen-bonded-polymer which was obtained according to the method described in Example 6 | 30 |
| Latex prepared above | 10 |
| Polyethylene glycol nonylphenyl ether | 1 |
| Mineral turpene | 59 |
| Total | 100 |

The mixture thus formed was strongly stirred in a homogenizing mixer to prepare an oil-in-water type of emulsion for use as a textile printing paste.

This emulsion was printed on a cloth by a printing machine, dried on a steam cylinder and heated at 130° C. for 5 minutes in air to obtain clear printed cloth having a high resistance against abrasion, washing and organic solvents.

EXAMPLE 44

The chromogen-bonded-polymer solution prepared according to the method described in the first step of Example 3 was treated with hydrochloric acid to acidify it or was treated with aqueous solution of barium chloride and thus insoluble chromogen-bonded-polymer paste was prepared as the precipitate.

The following components were mixed together:

| | Parts |
|---|---|
| The above insoluble chromogen-bonded-polymer paste | 80 |
| Polyethylene glycol nonyl phenyl ether | 20 |
| Total | 100 |

The mixture was vigorously stirred in a homogenizing mixer to prepare a water-dispersible chromogen-bonded-polymer slurry.

Further, the following components were mixed together:

| | Parts |
|---|---|
| The above water-dispersible chromogen-bonded-polymer slurry | 10 |
| The latex prepared according to the method described in Example 43 | 27 |
| 2% aqueous solution of hexamethylene bis-ethylene urea | 3 |
| Mineral turpene | 60 |
| Total | 100 |

The mixture was strongly stirred in a homogenizing mixer to prepare an oil-in-water type of emulsion for use as a textile printing paste.

This emulsion was printed on a cloth by a printing machine, dried on a steam cylinder and then heated at 130° C. for 5 minutes in air to obtain a clear printed cloth having high resistance against abrasion, washing and organic solvents.

EXAMPLE 45

| | Parts |
|---|---|
| Glycidylmethacrylate | 4.0 |
| Acrylamide | 1.0 |
| Buthylacrylate | 25.0 |
| Sodium alkylarylsulfonate | 0.9 |
| Ammonium persulfate | 0.1 |
| Water | 69.0 |
| Total | 100.0 |

The above components were reacted together at 70–80° C. for 6 hours in an emulsion polymerization vessel. The latex is thus prepared with about 28% of resin content. The following components were mixed together:

| | Parts |
|---|---|
| 5% solution of chromogen-bonded-polymer prepared according to the method described in Example 7 | 25 |
| The latex prepared described in above | 5 |
| Mineral turpene | 70 |
| Total | 100 |

The mixture was strongly stirred in a homogenizing mixer to prepare an oil-in-water type of emulsion for use as a textile printing paste.

This emulsion was printed on a cloth by a silk-screen printing machine, dried on a steam cylinder, and after dipping the cloth in a 0.2% aqueous sodium hydroxide solution, it was heated and dried to obtain a clear printed cloth having high resistance against abrasion, washing and organic solvents.

EXAMPLE 46

The following components were mixed together:

| | Parts |
|---|---|
| Chromogen-bonded-polymer solution prepared according to the method described in Example 2 | 25 |
| 2% aqueous solution of hexamethylene bis-ethylene urea | 5 |
| Polyethyleneglycol alkylether | 1 |
| Mineral turpene | 69 |
| Total | 100 |

The mixture was strongly stirred in a homogenizing mixer to prepare an oil-in-water type of emulsion for use as a textile printing paste.

The emulsion was printed on the warps only by a screen-printing machine, dried on a steam cylinder and heated. Then, they were weaved together with white or colored wefts to obtain a clear and beautiful screen printed cloth having high resistance against chemicals and superior physical properties.

EXAMPLE 47

The following components were mixed together:

| | Parts |
|---|---|
| Stannous chloride | 5 |
| Urea | 3 |
| Water | 31 |
| Polyethyleneglycol nonylphenylether | 1 |
| Mineral turpene | 60 |
| Total | 100 |

The mixture was stirred in a homogenizing mixer to prepare an oil-in-water type of emulsion for use as a resistant printing paste.

| | Parts |
|---|---|
| Above oil-in-water type of emulsion | 90 |
| 5% solution of chromogen-bonded-polymer prepared according to the method described in Example 6 | 10 |
| Total | 100 |

The above components were mixed together to prepare a resistant color printing paste.

The paste was then printed on a cloth, which was steeped in Naphthol AS solution, and dried on a steam cylinder. The cloth was then colored in a developer solution and washed. After eliminating the excess of Naphthol AS with a 0.2% aqueous solution of sodium hydroxide, the colored cloth was washed and dried on a steam cylinder to obtain clear colored cloth having high resistance against abrasion, washing and organic solvents.

EXAMPLE 48

The following components were mixed together:

| | Parts |
|---|---|
| 5% aqueous solution of methylcellulose | 50 |
| 10% solution of chromogen-bonded-polymer prepared by the method described in Example 1 | 20 |
| Zinc oxide paste (1:1) | 20 |
| Water | 10 |
| Total | 100 |

The resistant printing paste thus obtained was printed on a cloth. After drying and heat-treating it, the cloth was steeped in an aniline padding solution which consisted of the following components:

| | Parts |
|---|---|
| 3% methylcellulose aqueous solution | 8 |
| Aniline oil | 0.5 |
| Aniline salt | 8.5 |
| Potassium ferrocyanide | 5.4 |
| Sodium chlorate | 2 |
| Water | 74.6 |
| Total | 100.0 |

The cloth was dried on a steam cylinder for 15 minutes, then treated with sodium dichromate solution at 50° C. After washing and boiling the cloth, a clear resistant colored cloth was obtained.

EXAMPLE 49

The following components were mixed together to prepare a paste:

| | Parts |
|---|---|
| Ammonia | 2 |
| Water | 32 |
| Polyethyleneglycol octylphenylether | 1 |
| Mineral turpene | 65 |
| Total | 100 |

The following components were mixed together:

| | Parts |
|---|---|
| 5% solution of chromogen-bonded-polymer prepared according to the method described in the first step of Example 5 | 10 |
| Above described paste | 75 |
| Rongalite solution (1:1) | 15 |
| Total | 100 |

Thereafter, the mixture was printed on a cloth which was already dyed with direct dyestuff, and the cloth was then dried on a steam cylinder, heated for 5–10 minutes according to an ordinary steam-heating treatment, and washed and dried to obtain a clear and beautiful discharge printed cloth having an excellent resistance to chemicals and superior physical properties.

EXAMPLE 50

A printing paste which consisted of the following:

| | Parts |
|---|---|
| 5% chromogen-bonded-polymer solution as described in Example 1 | 35 |
| Polyethyleneglycol alkylether | 1 |
| Mineral turpene | 64 |
| Total | 100 |

This paste was printed on a refined and bleached cloth, and after the cloth was dried on a steam cylinder, a mixture of the following components

| | Parts |
|---|---|
| Rapidogen dyestuff (Red) | 5 |
| Methanol | 5 |
| 38° Be aqueous sodium hydroxide solution | 3 |
| Water | 12 |
| 5% aqueous solution of methylcellulose | 75 |
| Total | 100 | was printed on it. Then, the cloth was heated in a rapid-ager to develop the color. Two colored patterned cloth was obtained through washing, soaping, washing and drying steps.

EXAMPLE 51

Water was penetrated into a mixed spun cloth of terephthalic fibres and cotton fibres before the cloth was steeped in a Jigger with a chromogen-bonded-polymer solution prepared according to the method described in Example 5 and with 200 liters of water (Ratio 1:4). Dyeing was carried out so that a desired color was obtained under the elevated temperature.

After dyeing, the cloth was washed and dried on a steam cylinder, and then, it was heated at 130° C. for 5 minutes to obtain a clear printed cloth having high resistance to abrasion, washing and organic solvents.

EXAMPLE 52

95 parts of 3% aqueous solution of chromogen-bonded-polymer prepared according to the first step of the method described in Example 5 and 5 parts of 10% aqueous solution of melamine-formalin condensate were mixed together with 20 times their volume of water to prepare a dyeing bath.

After a refined and bleached cotton yarn was dyed with the above dyeing bath at 130° C. for 5 minutes, there was obtained a beautiful printed cloth having high chemical and physical resistance properties.

EXAMPLE 53

The following components were mixed together:

| | Parts |
|---|---|
| Latex of chromogen-bonded-polymer prepared according to the method described in Example 3 | 30 |
| Polyethyleneglycol laurylether | 1 |
| Mineral turpene | 39 |
| 50% xylene solution of long-oil alkyd resin | 30 |
| Total | 100 |

The mixture was strongly stirred in a homogenized mixer to prepare an oil-in-water type printing paste.

This paste was printed on a non-woven fabric which was prepared by using various binders together with synthetic fibers such as polyacrylonitrile, polyamide, polyester, etc., and natural fibers such as cotton. Then, the fabrics were dried on a steam cylinder and heated at 130° C. for 5 minutes in air to obtain a clear and brilliant color printed non-woven fabric having excellent chemical and physical properties.

EXAMPLE 54

3% of pulp solution was prepared by fully heating pulp in a beater and the solution was made up 100 parts by the addition of water thereto.

Thereafter, the solution was blended together with 10 parts of a mixture which consisted of rosin-scap, titanium dioxide and 5% aqueous solution of chromogen-bonded-polymer prepared according to the method described in Example 25. By adjusting the pH of the pulp solution to be slightly acid (pH=4.5–5.0) by adding 0.2 parts of aluminum sulfate, the chromogen-bonded-polymer was fixed.

A colored paper of 130 g./m.$^2$ was manufactured by a paper-making machine.

According to the method of this example, the yield of the filler increased considerably compared with that of the filler of the usual colored paper, and at the same time the quality of the obtained paper improved since the deterioration of paper usually caused by filling of pigment was eliminated.

EXAMPLE 55

A mixture consisting of the following components:

| | Parts |
|---|---|
| Latex prepared according to the method described in Example 43 | 80 |
| 10% solution of chromogen-bonded polymer prepared according to the method described in Example 28 | 20 |
| Total | 100 | was vigorously stirred in a mixer.

The mixture was homogeneously sprayed on a random-web consisting of 75% of nylon and 25% of staple-fiber and the web was dried at 130° C. for 10 minutes to obtain a strong and soft colored non-woven fabric having excellent properties.

EXAMPLE 56

358 parts of 4.8% aqueous sodium hydroxide solution and 80 parts of cellulose xanthate were mixed together and made up to 438 parts. 10 parts of 5% solution of chromogen-bonded-polymer prepared according to the method described in Example 1 and 0.3 parts of titanium dioxide were mixed with the solution obtained above, and after filtering and deforming, it was spun out into a common coagulation bath fiber with stretch and was drawn in a second bath at 80–90° C. After washing and drying at 50–60° C. for 3 hours, viscose rayon was obtained.

With this method defects such as a falling out of the pigment in the coagulation bath or limits imposed on the particle size which can be used may be completely eliminated.

EXAMPLE 57

80 parts of polyvinyl alcohol which were completely free from sodium acetate, were charged in a dissolver and diluted to a 15% solution by an addition of 453 parts of water. The polyvinyl alcohol was completely dissolved either by adjusting the pH of the solution to be slightly alkaline (pH=8–9), or by keeping the solution at 60–80° C. for 10–15 hours.

The solution thus obtained was stirred vigorously together with 10 parts of 5% solution of the chromogen-bonded-polymer prepared according to the first step of the method described in Example 5, and a homogeneous solution was thereby obtained.

After filtering and defoaming, the latter solution was spun out into a coagulation bath, heated at 200–300° C. for a few minutes, and acetalized to obtain a colored polyvinyl fiber.

According to the method of this example, such defects as the falling out of the pigment in the coagulation bath or limits imposed on the particle size which may be used, may be completely eliminated.

EXAMPLE 58

5 parts of 10% dimethylformamide solution of the chromogen-bonded-polymer prepared according to the method described in Example 21 and 95 parts of 10% dimethylformamide solution of polyacrylonitrile were mixed together to obtain a homogeneous solution.

The solution was spun to a clear colored yarn by a conventional wet yarn spinning process. A clear and beautiful polyacrylonitrile yarn was thus obtained.

EXAMPLE 59

Printing ink for cellulose or polyethylene film was prepared from the following components:

|  | Parts |
| --- | --- |
| 80% solution of the oil-soluble chromogen-bonded-polymer described in Example 4 | 10 |
| Polyamide condensate | 30 |
| Butanol | 30 |
| Toluene | 30 |
| Total | 100 |

The above chromogen-bonded-polymer composed of a self-cross-linkable resin attached many of the pigment molecules to form a pigment particle. Therefore, the colored prints obtained by a gravure printing had excellent properties against rub and solvents.

EXAMPLE 60

|  | Parts |
| --- | --- |
| The chromogen-bonded-polymer described in Example 11 | 27.9 |
| Barium sulfate | 13.1 |
| Printing ink varnish | 59.0 |
| Total | 100.0 |

Offset printing ink was prepared from the formula above by mixing them in a 3-rolled mill.

The above chromogen-bonded-polymer composed of a self-cross-linkable resin, attached many of the pigment molecules. In addition, once it had an organophilic group in its structure, the color was dispersed well into a printing ink varnish. The thus obtained printing ink had excellent tinting strength and printability. Color prints were obtained by offset printing which had outstanding rub-fastness, and other advantageous physical and chemical properties.

EXAMPLE 61

An oil-in-water type emulsion printing ink was obtained from the following composition:

|  | Parts |
| --- | --- |
| 5% solution of chromogen-bonded-polymer described in Example 6 | 35 |
| Polyethyleneglycol alkylether | 1 |
| Xylol | 64 |
| Total | 100 |

This emulsion was printed on a paper by gravure printing with the result that a beautiful print was obtained after heating to dryness. The color was firmly fixed on a paper fiber by tye reaction of it with the fiber, whereby the paper so printed had excellent properties against bleeding, rubbing, and solvents.

Similar coloring was also carried out using the chromogen-bonded-polymer prepared according to Example 29 instead of Example 6.

EXAMPLE 62

A water base printing ink was obtained by thoroughly mixing the following components in a colloid mill:

|  | Parts |
| --- | --- |
| 5% chromogen-bonded-polymer solution described in Example 7 | 35 |
| Gum arabic | 50 |
| Water | 15 |
| Total | 100 |

The printing ink was printed on a paper to obtain a wall-paper by flexographic printing. After heating the paper to dryness, the color was firmly fixed on the paper fiber because of the reaction of it with the fiber whereby the paper so printed had excellent properties against bleeding, rubbing, and solvents.

EXAMPLE 63

Xylene-cellosolveacetate - methylethylketone (4:3:3) solution of the chromogen-bonded-polymer described in Example 9 was sprayed uniformly on a surface of a leather by a high pressure spray gun and the leather was dried in an open air to obtain a colored leather.

EXAMPLE 64

|  | Parts |
| --- | --- |
| 5% chromogen-bonded-polymer solution described in the first step of Example 3 | 35.0 |
| Polyethyleneglycol alkylether | 1.0 |
| Mineral turpene | 64.0 |
| Total | 100.0 |

The above components were mixed together and strongly stirred in a homogenized mixer to obtain an oil-in-water type emulsion printing paste.

The paste was printed on de-fatted leather. After the drying of the leather in open air at 40° C., a printed leather was obtained.

EXAMPLE 65

10 parts of the chromogen-bonded-polymer prepared according to the method described in Example 27 was dissolved in 200 parts of water.

De-fatted leather was dipped in the latter solution at room temperature for 5 minutes. After drying the leather at 40° C. a dip-dyed leather having excellent fastness was obtained which was superior in properties to one obtained from a conventional method and had much gross with only a calender-treating. According to this example, the dyeing temperature may be relatively low compared to that of a conventional method, whereby it is much more economical.

EXAMPLE 66

Chromogen-bonded-polymer prepared according to the method described in Example 16 about twice the weight of glycerine and well-known suitable additives were mixed together to obtain a stamping ink.

Printed patterns made with this ink on paper or cloth by well-known printing methods had excellent properties with regard to physical and chemical resistance.

Similar coloring was also carried out using the chromogen-bonded-polymer prepared according to Example 20 instead of Example 16.

EXAMPLE 67

A mixture was made of the following components:

|  | Parts |
| --- | --- |
| The oil soluble chromogen-bonded-polymer powder prepared according to the method described in Example 11 | 80 |
| Linseed oil | 20 |
| Total | 100 |

The above components were blended and tubed to obtain an oil paint. This paint had excellent dispersibility, concentration and gloss. Pictures painted with this paint had bright hues, and strong rub-fastness.

EXAMPLE 68

| | Parts |
|---|---|
| 10% solution of the chromogen-bonded-polymer prepared according to the method described in Example 17 | 50 |
| 30% aqueous gum arabic solution | 30 |
| Glycerine | 20 |
| Total | 100 |

The above components were mixed together to obtain a water paint. Painting was carried out with the paint, the paint being suitably diluted with water. The resulting pictures were excellent in rub-fastness, because the chromogen-bonded-polymer reacted with and fixed to cellulose in the paper. The pictures had bright hues, and excellent chemical resistance.

EXAMPLE 69

10 parts of oil soluble chromogen-bonded-polymer prepared according to the method described in Example 4, 30 parts of alkyd resin, 35 parts of butanol and 25 parts of toluol were blended together in a dissolver to obtain a printing ink for hardboard printing.

The printing ink was printed on the well-base coated hardboard by a gravure-offset printing machine. The board was then dried in open air and heated by hot air to obtain a colored hardboard having excellent properties as to coloring and strong rub-fastness.

According to the conventional method of hardboard printing, a clear resin top-coating over the printed surface had been required. However, according to this method of printing, prints having an excellent rub-fastness were obtained without the need for the treating with clear resin top-coat.

EXAMPLE 70

In an aqueous solution of chromogen-bonded-polymer described in Example 13, woodchip was dipped and then dried to obtain colored chip having strong fastness for chemical resistance.

EXAMPLE 71

A wooden product was uniformly sprayed with the xylene-ethyl cellosolve-methyl ethyl ketone solution (2:1:1) of the chromogen-bonded-polymer prepared according to the method described in Example 8 using a high-pressure spray-gun.

After drying the wooden product in open air, a colored wooden product was obtained, having excellent color fastness.

Similar coloring was also carried out using the chromogen-bonded-polymer prepared according to Example 30 instead of Example 8.

EXAMPLE 72

Polyvinyl acetate emulsion was prepared by polymerization of the following components:

| | Parts |
|---|---|
| 5% aqueous solution of polyvinyl alcohol | 200 |
| Vinyl acetate | 100 |
| Potassium persulfate | 0.7 |
| Dimethylphthalate | 10 |
| Total | 310.7 |

9 parts of titanium dioxide, 10 parts of water and 5 parts of 5% aqueous solution of sodium phosphate were mixed together with the polyvinylacetate emulsion prepared above to obtain a white polyvinylacetate emulsion polymerization paint. After adding thereto a chromogen-bonded-polymer prepared according to the method described in Example 3, the emulsion paint obtained was applied to the wooden product to obtain beautifully colored wooden product having an excellent durability.

EXAMPLE 73

6 parts of casein and 10 parts of starch were mixed together with 30 parts of water. After permitting the starch and the casein to swell, 20 parts of 5% aqueous solution of sodium hydroxide was mixed therewith and heated at 60° C. to dissolve the casin and starch to produce a clear solution.

50 parts of 3% aqueous solution of sodium oleate were then added to the starch-casein solution to prepare a concentrated solution of soluble casein paint. The chromogen-bonded-polymer prepared according to the method described in Example 7 was mixed with this paint and the mixture was stirred.

Woodchip was painted with the resulting colored paint, and air-dried to obtain a colored woodchip having an excellent durability.

EXAMPLE 74

1 part of chromogen-bonded-polymer prepared according to the method described in Example 10 was dissolved in 6 parts of ethyl cellulose and mixed with 17 parts of 40% xylene-methyl ethyl ketone (1:1) mixed solution of thermosetting acrylic resin and 3 parts of 50% cellosolve acetate solution of epoxy resin.

After being diluted to a suitable viscosity, the resulting paint was sprayed on steel plate. After heating the sprayed paint at 150° C. for 30 minutes, a transparent colored steel plate was obtained having excellent fastness for mechanical tests.

EXAMPLE 75

A mixture composed of 300 parts of 38% formalin and 100 parts of urea was boiled for 4 hours at 40–45° C. After evaporating off the moisture from the mixture, the mixture was distillated under reduced pressure to obtain a transparent and sticky condensate as distillation residue. Thereafter, the condensate was dissolved in alcohol and the thus-prepared resin solution was applied over boards.

A top board was dipped in the resin-solution in which there was dissolved a chromogen-bonded-polymer prepared according to the method described in Example 1.

After air-drying the dipped board, discrete wooden boards were laminated and pressed thereon at 130° C. under a pressure of 1,500 lbs./in.$^2$ whereby a colored laminated board having excellent properties was thus obtained.

EXAMPLE 76

90 parts of rubber-latex which had been adjusted to 25% rubber content by the addition of water and 10 parts of the colored latex prepared according to the method described in Example 3 were mixed homogeneously to obtain a colored rubber latex.

By coagulating the latex and after-treating by known methods, there was obtained, a beautiful colored rubber. According to this method, the crosslinking of the crude rubber was so much accelerated by the heat of vulcanization that the resulting rubber was free from the deterioration and oxidation which often results from known methods of coloring.

EXAMPLE 77

The following components were blended together:

| | Parts |
|---|---|
| Chromogen-bonded-polymer prepared according to the method described in Example 12 | 1 |
| Process oil | 1 | and then mixed together with 100 parts of crude rubber by a 2-roll mill to obtain a beautiful colored rubber sheet.

According to this method, the rubber was exothermed to be at 100–130° C. during the rolling process. The operation time required was about 15 minutes, whereby the crosslinking of the rubber was much accelerated. The rapid crosslinking served to reinforce the rubber and also to eliminate its deterioration or oxidation.

EXAMPLE 78

95 parts of xylene-butyl acetate (1:1) was mixed with 5 parts of chromogen-bonded-polymer prepared according to the method described in Example 10 to obtain a colored solution.

With a high-pressure spray-gun, the solution was uniformly sprayed on the surface of a well-dried concrete wall and the wall was dried in open air to obtain a colored concrete wall.

According to this method of coloring, the surface of concrete wall was covered with a beautiful color which had an excellent covering power. Thus, the coloring solution obtained with the method of this example is advantageously utilizable for coloring materials consisting of cement, slate, mortar, etc.

EXAMPLE 79

The following mixture was prepared:

| | Parts |
|---|---|
| Methylmethacrylate | 150 |
| Azo-bis-isobutyronitrile | 0.4 |
| Chromogen-bonded-polymer powder prepared according to the method described in Example 19 | 0.1 |
| Total | 150.5 |

The chromogen-bonded-polymer powder and azo-bis-isobutylonitrile was dissolved in methylmethacrylate. After heating at 80° C. for 10 minutes, the solution was cooled and then filtered.

The thus-obtained syrupy solution was poured between two glass plates which were disposed in parallel, and held in a water-bath at 50° C. in order polymerize the monomer between the plates to produce a colored polymethylmethacrylate plate.

Similar coloring was also carried out using the chromogen-bonded-polymer prepared according to Example 24 instead of Example 19.

EXAMPLE 80

The following mixture was made:

| | Parts |
|---|---|
| Polymethylmethacrylate | 150 |
| Chromogen-bonded-polymer powder prepared according to the method described in Example 18 | 0.1 |
| Total | 150.1 |

The mixture was well mixed by tumbling and a molded polymethylmethacrylate product uniformly colored was obtained by feeding the mixture into a pressurized molding machine.

Similar coloring was also carried out using the chromogen-bonded-polymer prepared according to Example 23 instead of Example 18.

EXAMPLE 81

1000 parts of fatty acid and 1 part of chromogen-bonded-polymer prepared according to the method described in Example 15 were mixed together. According to the conventional process for making soap, the mixture was saponified, salted out, cooled and cut to prepare the colored soap.

EXAMPLE 82

2 parts of chromogen-bonded-polymer prepared according to the method described in Example 22 were dissolved in 3 parts of benzyl alcohol, and well-known suitable additives were mixed together therewith to obtain a ball-point pen ink.

In known ball-point pen inks, crystals of dye join and grow after a long storage period. However, in the ink made by this example, such phenomena did not occur. Written material written by this ink did not bleed in oils and fats which is an advantageous, axcellent property for ball-point pen ink.

Similar coloring was also carried out using the chromogen-bended-polymer prepared according to Example 26 instead of Example 22.

EXAMPLE 83

4 parts of 5% aqueous solution of the chromogen-bonded-polymer prepared according to the method described in Example 35 were homogeneously mixed with 99 parts of 20% aqueous solution of sodium alkylbenzene sulfonate. This solution was then dried with a spray drier to obtain a colored detergent powder.

EXAMPLE 84

A clear solution of the chromogen-bonded-polymer, prepared according to the method described in Example 36, and the well-known additive, ethyleneglycol, was installed into a felt pen type fountain pen. This water type felt pen ink was also employable in a nylon filament pen type fountain pen.

EXAMPLE 85

A white cotton cloth was dipped in a dyeing bath consisting of the following components:

| | Parts |
|---|---|
| A 2% acidic aqueous solution of the chromogen-bonded-polymer prepared according to the method described in Example 37 containing acetic acid | 98 |
| N,N,N',N'-tetraglycidyl hexamethylenediamine diacetic acid salt | 0.5 |
| Water | 1.5 |
| Total | 100 |

After dipping, the dipped cloth was put into 0.3% alkaline aqueous solution of sodium hydroxide. After this treatment, a colored cloth was obtained having excellent properties for washing and crocking.

EXAMPLE 86

A quantity 4 parts of the chromogen-bonded-polymer prepared according to the method described in Example 38 was added to 20 parts of 20% aqueous solution of ammonium hydroxide and diluted with water to 100 parts. This solution was then mixed with 4 parts of 50% aqueous solution of hexamethylmethylolmelamine and 20 parts of a latex (40% of solid content), copolymerized ethylacrylate-styrene-N-methylolacrylamide (80:18:2 by weight percent).

The above mixture was sprayed on a glass plate and cured at 150° C. for 20 minutes to obtain a colored glass plate.

EXAMPLE 87

A mixture consisting of the following components:

| | Parts |
|---|---|
| A latex of the chromogen-bonded-polymer prepared according to the method described in Example 39 | 90 |
| Hexamethylenediamine | 2 |
| Ethyleneglycoldiglycidylether | 1 |
| Water | 7 |
| Total | 100 | was stirred with a mixer.

A random-web consisting of polyester, acetate rayon and viscose stable fiber was dipped in a bath of the above mixture containing the chromogen-bonded-polymer latex. The dipped web was conveyed through a mangle and dried at 130° C. for 10 minutes to obtain a colored nonwoven fabric having excellent properties.

EXAMPLE 88

The following components were mixed together:

| | Parts |
|---|---|
| A 5% solution of the chromogen-bonded-polymer prepared according to the method described in Example 40 | 40 |
| Glyoxal | 0.5 |
| Water | 59.5 |
| Total | 100 |

A white cotton cloth was dipped in a bath of the above solution, passed through a mangle, dried at 60° C. and cured at 130° C. for 5 minutes to obtain a colored cloth having good properties.

EXAMPLE 89

The following components were mixed together:

| | Parts |
|---|---|
| A 5% solution of the chromogen-bonded-polymer prepared according to the method described in Example 41 | 50 |
| Hexamethylmethylolmelamine | 1 |
| Ammonium tartarate | 1 |
| Water | 48 |
| Total | 100 |

A leather was dipped in the above solution at room temperature for 3 minutes. After drying at 40° C., the dip-dyed leather was ironed for 2 minutes. A colored leather having excellent fastness was obtained.

While there have been described what are considered to be the preferred embodiments of this invention, it will be obvious to those skilled in the art that various changes and modifications may be made therein without departing from the invention and it is, therefore, aimed to cover all such changed and modifications as fall within the true spirit and scope of the invention.

What is claimed as new and desired to be secured by Letters Patent of the U.S. is:

1. A method of making a chromogen-bonded-polymer comprising diazotizing a chromogen-containing amino compound in aqueous medium containing hydrochloric acid in a quantity which exceeds its theoretically required molar quantity of hydrochloric acid by at least 10 mols per one amino radical to produce the diazotized product of said chromogen, stabilizing said diazotized product with a material selected from the group consisting of a first subgroup consisting of heavy metal salts, a second subgroup consisting of fluoroboric acid and its salts, a third subgroup consisting of arylsulfonic acids and salts thereof, a fourth subgroup consisting of alkylsulfonic acids and salts thereof and a fifth subgroup consisting of primary and secondary amino compounds to produce the stabilized diazonium or diazo product of said chromogen, filtering said stabilized diazonium or diazo product to obtain the filtered stabilized diazonium or diazo product, mixing said filtered stabilized diazonium or diazo product with an addition-polymerizable monomer and polymerizing said monomer using said filtered stabilized diazonium or diazo product as an initiator for the polymerization of said monomer to form the chromogen-bonded-polymer.

2. A method as defined in claim 1 wherein said first subgroup consists of zinc chloride, stannic chloride, calcium chloride, barium chloride and aluminum chloride.

3. A method as defined in claim 1 wherein said second subgroup consists of fluoroboric acid, sodium fluoroborate and potassium fluoroborate.

4. A method as defined in claim 1 wherein said third subgroup consists of dodecylbenzene sulfonic acid, p-chlorobenzene sulfonic acid, naphthalene-1.5-disulfonic acid, naphthalene-2.6-disulfonic acid, poly(methylenenaphthalene)poly sulfonic acid and their salts.

5. A method as defined in claim 1 wherein said fourth subgroup consists of laurylsulfuric acid and lauryl sulfate.

6. A method as defined in claim 1 wherein said fifth subgroup consists of 2-methyliminobenzoic acid-5-sulfonic acid, N-methyltaurine, and sarcosine.

7. A method as defined in claim 1 wherein said addition-polymerizable monomer is selected from a group consisting of a first subgroup consisting of addition-polymerizable monomers which have at least one active-reactive radical selected from the group consisting of methylol, alkylmethylol, sulfomethylol, epoxy, chlorohydrin, ethyleneimide, N-sulfoethyleneurea, acid chloride, chlorotriazine, ketene, aldehyde, vinyl, isocyanate, acid azide and phenyl urethane radicals in their structures and which, after polymerization, form a polymer containing in its structure said active-reactive radicals, a second subgroup consisting of addition-polymerizable monomers which have at least one weakly-reactive radical selected from the group consisting of hydroxyl, mercapto, amino, imino, carboxyl, carboamide, sulfoamide, urea, ureido, urethane and nitrile radicals in their structures and which, after polymerization, form a polymer containing in its structure said weakly-reactive radicals which are capable of linking with active-reactive radicals but incapable of crosslinking on themselves under ordinary crosslinking condition and a third subgroup consisting of addition polymerizable monomers which have at least one non-reactive radical selected from the group consisting, alkylester, arylester, alkyl, alicyclic, aryl, chloride, alkylcarbonyl, alkylether, N,N-dialkylamide, N-alkylimide, tertiaryamino, sulfo and pyridine radicals in their structure and which, after polymerization, form a polymer containing in its structure said non-reactive radicals which are incapable of linking with themselves or reactive radicals under ordinary crosslinking condition.

8. A method as defined in claim 7 in which said second subgroup consists of a first subdivision consisting of water dispersible monomers selected from the group consisting of acrylic acid, methacrylic acid, crotonic acid, itaconic acid, maleic acid, fumaric acid, acrylamide, methacrylamide, crotonic amide, itaconic diamide, itaconic monoamide, maleic diamide, maleic monoamide, fumaric amide, ethyleneglycolmonoacrylate, ethyleneglycolmonomethacrylate, polyethyleneglycolmonoacrylate, polyethyleneglycolmonomethacrylate, polyethyleneglycolmonoitaconatemonoamide, polyethyleneglycolmonofumarate monoamide and N-vinyl urea; and a second subdivision consisting of oil dispersible monomers selected from the group consisting of monomethylitaconate, monomethylmaleate, monoethylithaconate, monobutylitaconate, propanediolmonoacrylate, propanediolmonomethacrylate, propanediolmonoitaconate, propanediolmonomaleate, polypropylene glycolmonoacrylate, polypropyleneglycolmonomethacrylate, butanediolmonoacrylate, butanediolmonomethacrylate, butanediolmonoitaconate, acrylonitrile, methacrylonitrile, crotonic nitrile and itaconic nitrile.

9. A method as defined in claim 7 in which said third subgroup consists of a first subdivision consisting of water-dispersible monomers selected from the group consisting of N-vinyl pyrrolidone and 2-vinyl-5-methyl pyridine and a second subdivision consisting of oil-dispersible monomers selected from the group consisting of methyl acrylate, methylmethacrylate, methyl crotonate, dimethyl itaconate, dimethyl maleate, methyl fumarate, ethyl acrylate, ethylmethacrylate, ethyl crotonate, diethyl itaconate, ethylmaelate, ethylfumarate, propyl acrylate, propylmethacrylate, propyl itaconate, butyl acrylate, butyl methacrylate, butyl itaconate, butyl maleate, butyl fumarate, hexyl acrylate, hexyl methacrylate, hexyl itaconate, octyl acrylate, octyl methacrylate, octyl crotonate, octyl itaconate, octyl maleate, octyl fumarate, lauryl acrylate, lauryl methacrylate, lauryl itaconate, stearyl acrylate, stearyl methacrylate, stearyl itaconate, vinyl acetate, vinyl propionate, vinyl stearate, styrene, vinyl toluene, vinyl chloride, vinylidene chloride, method vinyl ketone, N-vinyl-ε-caprolactum, N-vinyl phthalimide, butadiene, isoprene and chloroprene.

10. A method as defined in claim 1 and further including the step of reacting the chromogen-bonded-polymer with materials selected from the group consisting of formaldehyde, di-, tri-, and tetra-methylol-urea, di-, tri-, tetra-, penta-, and hexamethylolmelamine, di-, tri- tetra-, penta-, and hexaalkylmethylolmelamine, epichlorohydrin, dichlorohydrin and ethyleneimine, all of which, when reacted with said polymer, provide reactive functional radicals selected from the group consisting of N-methylolamide, N-alkylmethylolamide, epoxy, chlorohydrin, ethyleneimide, acid chloride and isocyanate-forming radicals for said polymer to produce the chromogen-bonded-polymer having said reactive functional radicals in its structure.

11. A method as defined in claim 1 and further including the step of reacting the chromogen-bonded-polymer with materials selected from the group consisting of chloroacetic acid, sodium bisulfate, sulfonic acid, ethyleneoxide, methanol, ethanol, propanol, glycidal, glycerine, ammonia, methylamine, ethylamine, butylamine, dimethylamine diethylamine, dibutylamine ethylenediamine, propyllenediamine, hexamethylenediamine, diethylenetriamine, dipropylenetriamine, alkale, acid, stearylamine, butanol octylalcohol, stearic acid, palmitic acid, uleic acid, stearylamide and N-methylolstearlylamide, all of which, when reacted with said polymer, provides solubilizable and dispersible radicals selected from the group consisting of carboxyl, sulfate, sulfo, hyrdoxyl, ether, carbonamide, amino, imino, tertiary amino, and pyridine radicals, alphatic hydrocarbon radicals having 2 to 18 carbon atoms, and aromatic and cyclic hydrocarbon radicals for said polymer to produce the chromogen-bonded-polymer having said solubilizable and dispersible radicals in its structure.

12. A method as defined in claim 1 wherein said chromogen-containing amino compounds is selected from the group consisting of homocyclic threne-containing amino compound perinone-containing amino compound, perylene-containing amino compound, flavanthrone-containing amino compound, pyrimidine-containing amino compound, indanthrone-containing amino compound, amino quinacridone, amino dioxazine, anthraquinonylamino-s-triazine-containing amino compound, mono-, di-tetra-and polyamino metal phthalocyamine, amino indigo, azo coupling compound and azo condensation compound.

13. A method as defined in claim 7 wherein said subgroup consists of a first subdivision consisting of water-dispersible monomers selected from the group consisting of N-methylol, N-methylmethylol, N-ethylmethylol, N-propylmethylol and N-ulfomethyl derivatives of acrylamide, methacrylamide, crotonic amide, itaconic amide, maleic amide, fumaric amide, vinyl urea and 4.6-diamino-2-vinyl-s-triazine; acrylic azide, methalacrylic azide, N-sulfoethylacrylimide, N-sulfoethylmethacrylimide and acrolein; and a second subdivision consisting of oil dispersible monomers selected from the group consisting of acid chloride, ethyleneimide, glycidyl ester and β-hydroxy-γ-chloro-n-propyl ester derivatives of acrylic acid, methacrylic acid, crotonic acid and itaconic acid; itaconic anhydride, maleic anhydride; methacrolein, crotonic aldehyde, itaconic aldehyde; N-butylmethylol derivatives of acrylamide, methacrylamide, vinyl urea and 4,6-diamino-2-vinyl-s-triazine; vinyl isocyanate, propenyl isocyanate, vinyl phenyl propenyl urethane, propenyl phenyl urethane; vinyl ethylene urea, propenyl ethylene urea; 4.6-dichloro-2-vinyl-s-triazine, 4-chloro-6-amino-2-vinyl-s-triazine, 4.6-diethyleneimino-2-vinyl-s-triazine; allylglycidyl ether, allyl-β-hydroxy-γ-chloro-n-propyl ether, N,N'-methylene-bis-acrylamide, N,N'-methylene-bis-methacrylamide; ethyleneglycol diester, polyethyleneglycol diester, propanediol diester, polypropyleneglycol diester and butanediol diester derivatives of acrylic acid, methacrylic acid and itaconic acid; allyl acrylate and allyl methacrylate.

References Cited
UNITED STATES PATENTS

| | | | |
|---|---|---|---|
| 2,500,023 | 3/1950 | Burk | 260—88.3 |
| 2,996,381 | 8/1961 | Oster et al. | 96—49 |
| 3,190,850 | 6/1965 | Burke | 260—38 |
| 3,232,691 | 2/1966 | Wilhelm et al. | 260—144 |
| 2,274,551 | 2/1942 | Kenyon et al. | 260—41C |
| 3,337,288 | 8/1967 | Horiguchi et al. | 260—41C |
| 3,340,221 | 9/1967 | Goldberg et al. | 260—41C |
| 3,344,098 | 9/1967 | Horiguchi et al. | 260—41C |

FOREIGN PATENTS

| | | | |
|---|---|---|---|
| 949,404 | 2/1964 | Great Britain | 8—Dye Polymer |

ALLAN LIEBERMAN, Primary Examiner

U.S. Cl. X.R.

260—37, 144